(12) United States Patent
Ogawa

(10) Patent No.: US 10,286,834 B2
(45) Date of Patent: *May 14, 2019

(54) VEHICLE EXTERIOR ENVIRONMENT RECOGNITION APPARATUS

(71) Applicant: SUBARU CORPORATION, Tokyo (JP)

(72) Inventor: Genya Ogawa, Tokyo (JP)

(73) Assignee: Subaru Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/347,678

(22) Filed: Nov. 9, 2016

(65) Prior Publication Data
US 2017/0144585 A1    May 25, 2017

(30) Foreign Application Priority Data

Nov. 25, 2015   (JP) ................................ 2015-229928

(51) Int. Cl.
*B60Q 1/14*      (2006.01)
*G06K 9/46*      (2006.01)
(Continued)

(52) U.S. Cl.
CPC ......... *B60Q 1/143* (2013.01); *G06K 9/00825* (2013.01); *G06K 9/4661* (2013.01);
(Continued)

(58) Field of Classification Search
CPC .............. B60Q 1/143; B60Q 2300/42; B60Q 2300/41; B60Q 2300/056; G06K 9/00825; B60W 30/16
See application file for complete search history.

(56) References Cited

U.S. PATENT DOCUMENTS

| | | |
|---|---|---|
| 5,660,454 A | 8/1997 | Mori et al. |
| 6,831,261 B2 | 12/2004 | Schofield et al. |

(Continued)

FOREIGN PATENT DOCUMENTS

| | | |
|---|---|---|
| JP | H11-187390 A | 7/1999 |
| JP | 3349060 B2 | 11/2002 |

(Continued)

OTHER PUBLICATIONS

Office Action issued in corresponding Japanese Patent Application No. 2015-229928, dated Aug. 1, 2017 with English Translation.

(Continued)

*Primary Examiner* — Alan D Hutchinson
(74) *Attorney, Agent, or Firm* — McDermott Will & Emery LLP

(57) ABSTRACT

A vehicle exterior environment recognition apparatus includes a computer and an illumination mechanism. The computer serves as a preceding vehicle extractor that extracts a tail lamp of a preceding vehicle, a preceding vehicle recognizer that recognizes the preceding vehicle on a basis of the extracted tail lamp, and a light-distribution controller that determines a light distribution of a headlamp. The illumination mechanism switches between a low beam and a high beam on a basis of instruction issued by the light-distribution controller. The preceding vehicle extractor acquires instruction information related to the instruction on the determination issued by the light-distribution controller and result information related to a result of beam application performed by the illumination mechanism, and extracts, by a threshold corresponding to the low beam, the tail lamp for a region in which either one of the instruction information and the result information indicates application of the low beam.

4 Claims, 10 Drawing Sheets

(51) Int. Cl.
*G06K 9/62* (2006.01)
*G06K 9/00* (2006.01)
*B60W 30/16* (2012.01)

(52) U.S. Cl.
CPC ...... *G06K 9/6215* (2013.01); *B60Q 2300/056* (2013.01); *B60Q 2300/41* (2013.01); *B60Q 2300/42* (2013.01); *B60W 30/16* (2013.01)

(56) References Cited

U.S. PATENT DOCUMENTS

| | | | |
|---|---|---|---|
| 7,839,303 | B2 | 11/2010 | Kumon et al. |
| 8,170,286 | B2 | 5/2012 | Kashimura et al. |
| 8,180,108 | B2 | 5/2012 | Rebut et al. |
| 8,970,357 | B2 | 3/2015 | Usami |
| 9,415,719 | B2 | 8/2016 | Hayakawa et al. |
| 9,436,880 | B2 | 9/2016 | Bos et al. |
| 9,589,080 | B2 | 3/2017 | Rentschler et al. |
| 9,842,263 | B2 | 12/2017 | Kim et al. |
| 2003/0138131 | A1 | 7/2003 | Stam et al. |
| 2003/0227777 | A1 | 12/2003 | Schofield |
| 2004/0143380 | A1 | 7/2004 | Stam et al. |
| 2005/0225439 | A1 | 10/2005 | Watanabe et al. |
| 2006/0018511 | A1 | 1/2006 | Stam et al. |
| 2008/0088481 | A1 | 4/2008 | Kumon et al. |
| 2009/0073706 | A1 | 3/2009 | Tatara et al. |
| 2010/0194889 | A1 | 8/2010 | Amdt et al. |
| 2011/0274316 | A1 | 11/2011 | Jeong et al. |
| 2012/0089321 | A1 | 4/2012 | Jung |
| 2012/0182425 | A1 | 7/2012 | Higgins-Luthman et al. |
| 2013/0131922 | A1* | 5/2013 | Ogata ................ B60Q 1/143 701/36 |
| 2013/0207543 | A1 | 8/2013 | Tatara |
| 2013/0271285 | A1 | 10/2013 | Sako et al. |
| 2014/0022068 | A1 | 1/2014 | Usami |
| 2014/0091710 | A1 | 4/2014 | Ehlgen |
| 2014/0293055 | A1 | 10/2014 | Otsuka |
| 2014/0355280 | A1 | 12/2014 | Fujiyoshi |
| 2014/0355827 | A1 | 12/2014 | Ogawa |
| 2015/0002015 | A1 | 1/2015 | Hayakawa et al. |
| 2015/0042805 | A1 | 2/2015 | Okumura et al. |
| 2015/0117715 | A1* | 4/2015 | Murao ................ G06K 9/38 382/104 |
| 2015/0278615 | A1 | 10/2015 | Ogawa |
| 2017/0008455 | A1 | 1/2017 | Goudy et al. |
| 2017/0132477 | A1 | 5/2017 | Kim et al. |
| 2017/0144585 | A1 | 5/2017 | Ogawa |
| 2017/0308769 | A1 | 10/2017 | Deng et al. |

FOREIGN PATENT DOCUMENTS

| | | |
|---|---|---|
| JP | 2008-094249 A | 4/2008 |
| JP | 2013-060140 A | 4/2013 |
| JP | 2013-209035 A | 10/2013 |
| JP | 2014-231301 A | 12/2014 |
| JP | 2014-232408 A | 12/2014 |
| JP | 2014-232409 A | 12/2014 |
| JP | 2014-232430 A | 12/2014 |
| JP | 2014-232431 A | 12/2014 |
| JP | 2015-035704 A | 2/2015 |
| JP | 2015-136066 A | 7/2015 |
| WO | 2012/140752 A1 | 10/2012 |

OTHER PUBLICATIONS

Non-final Office Action issued in related U.S. Appl. No. 15/359,201, dated Sep. 20, 2018 (13 pages).

Final Office Action issued in related U.S. Appl. No. 15/359,201, dated May 15, 2018.

Decision to Grant issued in corresponding Japanese Patent Application No. 2015-229929, dated Aug. 1, 2017.

Ex Parte Quayle Office Action issued in related U.S. Appl. No. 15/359,201, dated Jan. 23, 2019 (14 pages).

* cited by examiner

FIG. 5A
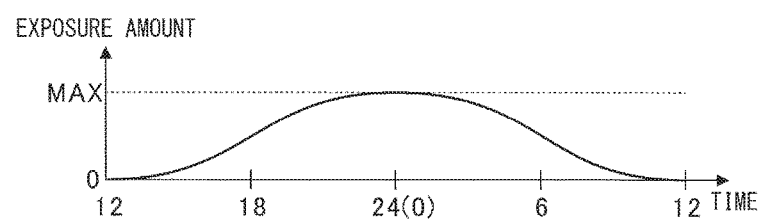
FIG. 5B
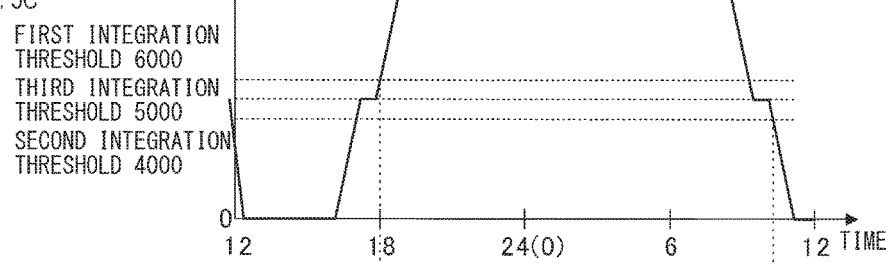
FIG. 5C
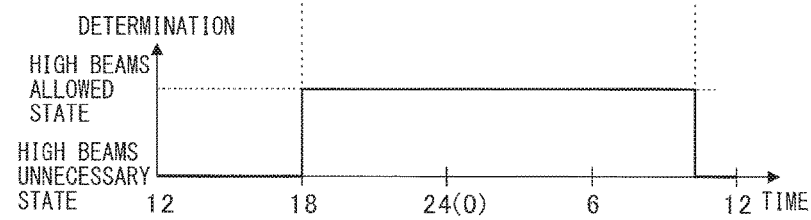
FIG. 5D

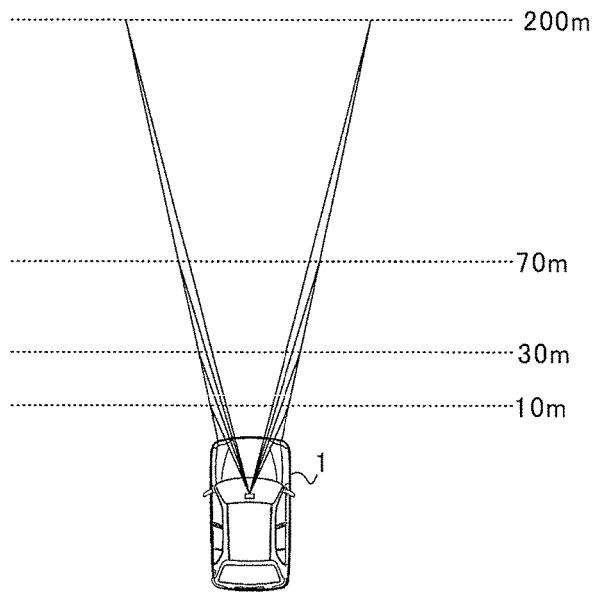

FIG. 13A

| CONDITION | CUT-OFF LINE ANGLE |
|---|---|
| 0≤DEPTH DISTANCE<10 | 31.9 |
| 10≤DEPTH DISTANCE<30 | 24.9 |
| 30≤DEPTH DISTANCE<70 | 20.2 |
| 70≤DEPTH DISTANCE<200 | 16.9 |
| 200≤DEPTH DISTANCE | 14.7 |

FIG. 13B

| TRAVELING SCENE | THE NUMBER OF THREE-DIMENSIONAL OBJECTS | HBA | ADB |
|---|---|---|---|
| HIGH BEAMS UNNECESSARY SCENE | 1 OR MORE | NON-APPLICATION OF HIGH BEAMS | NON-APPLICATION OF HIGH BEAMS |
| | 0 | NON-APPLICATION OF HIGH BEAMS | NON-APPLICATION OF HIGH BEAMS |
| HIGH BEAMS AVAILABLE SCENE | 1 OR MORE | NON-APPLICATION OF HIGH BEAMS | APPLICATION OF HIGH BEAMS TO SOME REGIONS |
| | 0 | APPLICATION OF HIGH BEAMS | APPLICATION OF HIGH BEAMS TO ALL REGIONS |

FIG. 14

VEHICLE EXTERIOR ENVIRONMENT RECOGNITION APPARATUS

CROSS-REFERENCE TO RELATED APPLICATIONS

The present application claims priority from Japanese Patent Application No. 2015-229928 filed on Nov. 25, 2015, the entire contents of which are hereby incorporated by reference.

BACKGROUND

The technology relates to a vehicle exterior environment recognition apparatus that performs a light-distribution control of headlamps, on the basis of an environment outside a vehicle, i.e., a vehicle exterior environment.

A technique has been known in which a three-dimensional object, such as a preceding vehicle located ahead of an own vehicle, is detected to perform a control that avoids collision with the preceding vehicle (i.e., a collision avoidance control) or to perform a control that keeps an inter-vehicular distance between the own vehicle and the preceding vehicle to a safe distance (i.e., a cruise control). For example, reference is made to Japanese Patent No. 3349060.

Further, with the increasing adoption of an auto light function for safe traveling at night, a technique has been developed in which brightness of a surrounding environment is determined on the basis of exposure information obtained from a monitor sensor and a result of the determination is utilized for the auto light function. For example, reference is made to Japanese Unexamined Patent Application Publication (JP-A) No. H11-187390. The auto light function turns on headlamps automatically when brightness outside the vehicle becomes insufficient. A technique has been also developed in which a light-distribution control of the headlamps is performed on the basis of tail lamps of the preceding vehicle, as disclosed in JP-A No. 2013-209035.

SUMMARY

Upon performing a light-distribution control of headlamps, it is desirable that tail lamps of a preceding vehicle be identified accurately to prevent the preceding vehicle from being irradiated with high beams. What is therefore desired is further improvement in identification accuracy.

It is desirable to provide a vehicle exterior environment recognition apparatus that increases identification accuracy of a tail lamp of a preceding vehicle.

An aspect of the technology provides a vehicle exterior environment recognition apparatus that include: a preceding vehicle extractor that extracts a tail lamp of a preceding vehicle from an image; a preceding vehicle recognizer that recognizes the preceding vehicle on a basis of the tail lamp extracted by the preceding vehicle extractor; and a light-distribution controller that determines a light distribution of a headlamp of an own vehicle on a basis of a result of the recognition performed by the preceding vehicle recognizer, and a illumination mechanism switches between a low beam and a high beam of the headlamp on a basis of an instruction issued by the light-distribution controller. The preceding vehicle extractor acquires instruction information related to the instruction on the determination on the light distribution issued by the light-distribution controller and result information related to a result of beam application performed by the illumination mechanism, and extracts, by a threshold that corresponds to the low beam, the tail lamp for a region in which either one of the instruction information and the result information indicates application of the low beam.

Another aspect of the technology provides a vehicle exterior environment recognition apparatus that includes circuitry and an illumination mechanism. The circuitry extracts a tail lamp of a preceding vehicle from an image, recognizes the preceding vehicle on a basis of the tail lamp extracted from the image, and determines a light distribution of a headlamp of an own vehicle on a basis of a result of the recognition of the preceding vehicle. The illumination mechanism switches between a low beam and a high beam of the headlamp on a basis of an instruction that is issued on a basis of the determination on the light distribution. The circuitry acquires instruction information related to the instruction on the determination on the light distribution issued on the basis of the determination and result information related to a result of beam application performed by the illumination mechanism, and extracts, by a threshold that corresponds to the low beam, the tail lamp for a region in which either one of the instruction information and the result information indicates application of the low beam.

BRIEF DESCRIPTION OF THE DRAWINGS

FIGS. 5A, 5B, 5C and 5D describe an example of a determination process to be performed by a necessity determiner.

FIG. 13A and FIG. 13B describe a table directed to the cut-off line angles.

FIG. 14 describes an operation to be performed by a light-distribution controller.

DETAILED DESCRIPTION

Figure 1:
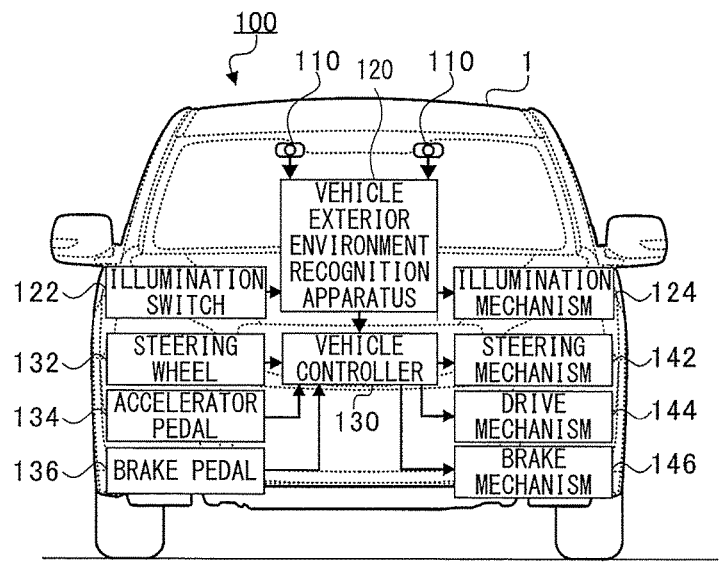
FIG. 1 is a block diagram illustrating a relationship of connection in a vehicle exterior environment recognition system.

In the following, some preferred but non-limiting implementations of the technology are described in detail with reference to the accompanying drawings. Note that sizes, materials, specific values, and any other factors illustrated in respective implementations are illustrative for easier understanding of the technology, and are not intended to limit the scope of the technology unless otherwise specifically stated.

Throughout the present specification and the drawings, elements having substantially the same function and configuration are denoted with the same reference numerals to avoid any redundant description. Further, elements that are not directly related to the technology are unillustrated in the drawings.

[Vehicle Exterior Environment Recognition System 100]

FIG. 1 is a block diagram illustrating a relationship of connection in a vehicle exterior environment recognition system 100. The vehicle exterior environment recognition system 100 may include image-capturing units 110, a vehicle exterior environment recognition apparatus 120, and a vehicle controller (e.g., an engine control unit (ECU)) 130. The implementation may include two image-capturing units 110 without limitation.

The two image-capturing units 110 each may include an imaging device such as, but not limited to, a charge-coupled device (CCD) and a complementary metal-oxide semiconductor (CMOS). The image-capturing units 110 each may capture an image of a vehicle exterior environment ahead of an own vehicle 1, and each may generate a luminance image that contains at least information on luminance. The luminance image may be a color image or a monochrome image. The two image-capturing units 110 may be so disposed that their respective optical axes become substantially parallel to each other along a traveling direction of the own vehicle 1. In addition, the two image-capturing units 110 may be so disposed as to be separated away from each other in a substantially horizontal direction. The image-capturing units 110 each may continuously generate the luminance image for each frame of, for example but not limited to, 1/60 second (at a frame rate of 60 fps). The luminance image may be obtained as a result of the image capturing performed on a three-dimensional object in a detection region that is ahead of the own vehicle 1. In this implementation, the luminance images that are different from each other in viewpoint are generated by the two image-capturing units 110, making it possible to sense a distance from the own vehicle 1 (the image-capturing units 110) to the three-dimensional object. Note that the three-dimensional objects to be recognized by the image-capturing units 110 may include a three-dimensional object that is present independently and an object as a part of the independently-present three-dimensional object. Non-limiting examples of the independently-present three-dimensional object may include a vehicle (including a preceding vehicle and an oncoming vehicle), a pedestrian, a street light, a traffic light, a road (or a traveling path), a road sign, a guardrail, and a building.

The vehicle exterior environment recognition apparatus 120 may obtain the luminance image from each of the two image-capturing units 110. By obtaining the luminance images, the vehicle exterior environment recognition apparatus 120 may derive a parallax (a depth distance) and a screen position with use of so-called pattern matching to thereby derive a three-dimensional position of each block. The screen position indicates a position of any block in a screen. The pattern matching may involve searching a block (as an aggregate of pixels) corresponding to any block extracted from one of the luminance images in the other of the luminance images. The vehicle exterior environment recognition apparatus 120 may then identify the three-dimensional object present in the vehicle exterior environment, such as the preceding vehicle that travels in the same direction as the own vehicle 1 and the oncoming vehicle that travels closer to the own vehicle 1 in an oncoming fashion. Further, when the three-dimensional object is thus identified, the vehicle exterior environment recognition apparatus 120 may so control the own vehicle 1 as to avoid collision with the three-dimensional object (i.e., a collision avoidance control) or to keep an inter-vehicular distance between the own vehicle 1 and the preceding vehicle to a safe distance (i.e., a cruise control).

The vehicle exterior environment recognition apparatus 120 may also receive a request (i.e., an intention) of a driver through an illumination switch 122, and perform, in accordance with the vehicle exterior environment, a light-distribution control of headlamps or any other illuminator with use of an illumination mechanism 124. Non-limiting examples of the light-distribution control may include high beam assist (HBA) and adaptive driving beam (ADB). The HBA may turn off high beams when the three-dimensional object in which application of the high beams is undesirable is present ahead of the own vehicle 1, and turn on the high beams when the irradiation-undesirable three-dimensional object is not present ahead of the own vehicle 1. Non-limiting examples of the irradiation-undesirable three-dimensional object may include the preceding vehicle and the oncoming vehicle. The ADB may variably set regions to be irradiated with the high beams, and refrain from applying the high beams only to the region in which the irradiation-undesirable three-dimensional object is present, and apply the high beams to the regions in which the three-dimensional objects other than the irradiation-undesirable three-dimensional object, such as a street light, a road sign, a sign, and a reflector, are possibly present. To achieve the light-distribution control, a main switch and a dimmer switch may be provided as the illumination switch 122. The main switch may switch positions of lighting states of the lamps from one lighting state position to another, and the dimmer switch may switch between a position in which the use of the high beams is not allowed and a position in which the use of the high beams is allowed. The lighting states of the lamps may include off, small lamp (position lamp), on (low beams), and auto light. The illumination mechanism 124 may include a mechanism that switches between the low beams and the high beams in one implementation where the light-distribution control is based on the HBA, and include a mechanism that variably sets the regions to be irradiated with the high beams in one implementation where the light-distribution control is based on the ADB.

The vehicle controller 130 may control the own vehicle 1 by receiving information on an operation input of the driver through a steering wheel 132, an accelerator pedal 134, and a brake pedal 136 and sending the information on the operation input to a steering mechanism 142, a drive mechanism 144, and a brake mechanism 146. The vehicle controller 130 may control the steering mechanism 142, the drive mechanism 144, and the brake mechanism 146, in accordance with instructions received from the vehicle exterior environment recognition apparatus 120.

For example, in order to perform the cruise control in relation to the preceding vehicle and prevent the preceding vehicle and the oncoming vehicle from being irradiated with the high beams, it is desirable that the vehicle exterior environment recognition system 100 identify the preceding vehicle and the oncoming vehicle promptly and accurately. The vehicle exterior environment recognition system 100 according to one implementation may obtain information on three-dimensional positions and color information with use of the luminance images acquired from the two image-capturing units 110 to identify the preceding vehicle and the oncoming vehicle promptly and accurately, and thereby perform the light-distribution control of the headlamps appropriately.

In the following, a description is given in detail of a configuration of the vehicle exterior environment recognition apparatus 120. A description is given here in detail of the light-distribution control of the headlamps as one of features of this implementation. Note that a configuration less related to the features of the implementation will not be described in detail.

[Vehicle Exterior Environment Recognition Apparatus 120]

Figure 2:
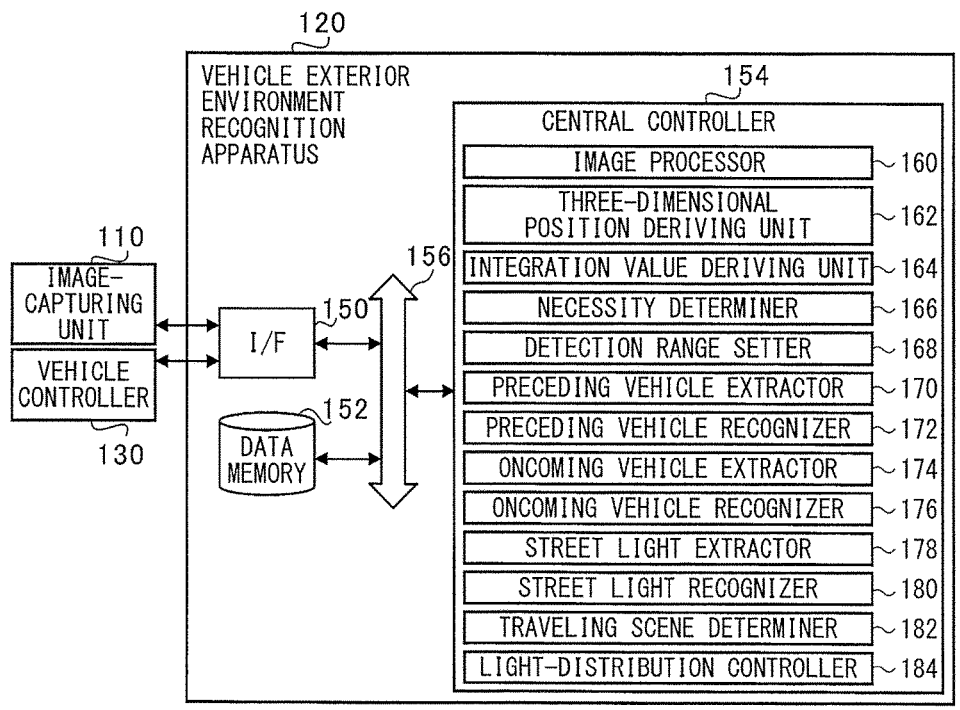
FIG. 2 is a functional block diagram illustrating schematic functions of a vehicle exterior environment recognition apparatus.

FIG. 2 is a functional block diagram illustrating schematic functions of the vehicle exterior environment recognition apparatus 120. Referring to FIG. 2, the vehicle exterior environment recognition apparatus 120 may include an interface (I/F) 150, a data memory 152, and a central controller 154.

The interface 150 may exchange information bilaterally between devices including, without limitation, the image-capturing units 110 and the vehicle controller 130. The data memory 152 may include a random access memory (RAM), a flash memory, a hard disk drive (HDD), or any other suitable storage device. The data memory 152 may store various pieces of information necessary for processes to be carried out by the functional blocks to be described hereinafter.

The central controller 154 may include a semiconductor integrated circuit, and may control devices including, without limitation, the interface 150 and the data memory 152 through a system bus 156. The semiconductor integrated circuit may have devices such as, but not limited to, a central processing unit (CPU), a read only memory (ROM) in which programs, etc., are stored, and a random access memory (RAM) serving as a work area. In this implementation, the central controller 154 may also function as an image processor 160, a three-dimensional position deriving unit 162, an integration value deriving unit 164, a necessity determiner 166, a detection range setter 168, a preceding vehicle extractor 170, a preceding vehicle recognizer 172, an oncoming vehicle extractor 174, an oncoming vehicle recognizer 176, a street light extractor 178, a street light recognizer 180, a traveling scene determiner 182, and a light-distribution controller 184. In the following, a description is given in detail, together with an operation of each of such functional blocks, of a vehicle exterior environment recognition process that is directed to the light-distribution control of the headlamps and is one of the features of this implementation.

[Vehicle Exterior Environment Recognition Process]

Figure 3:
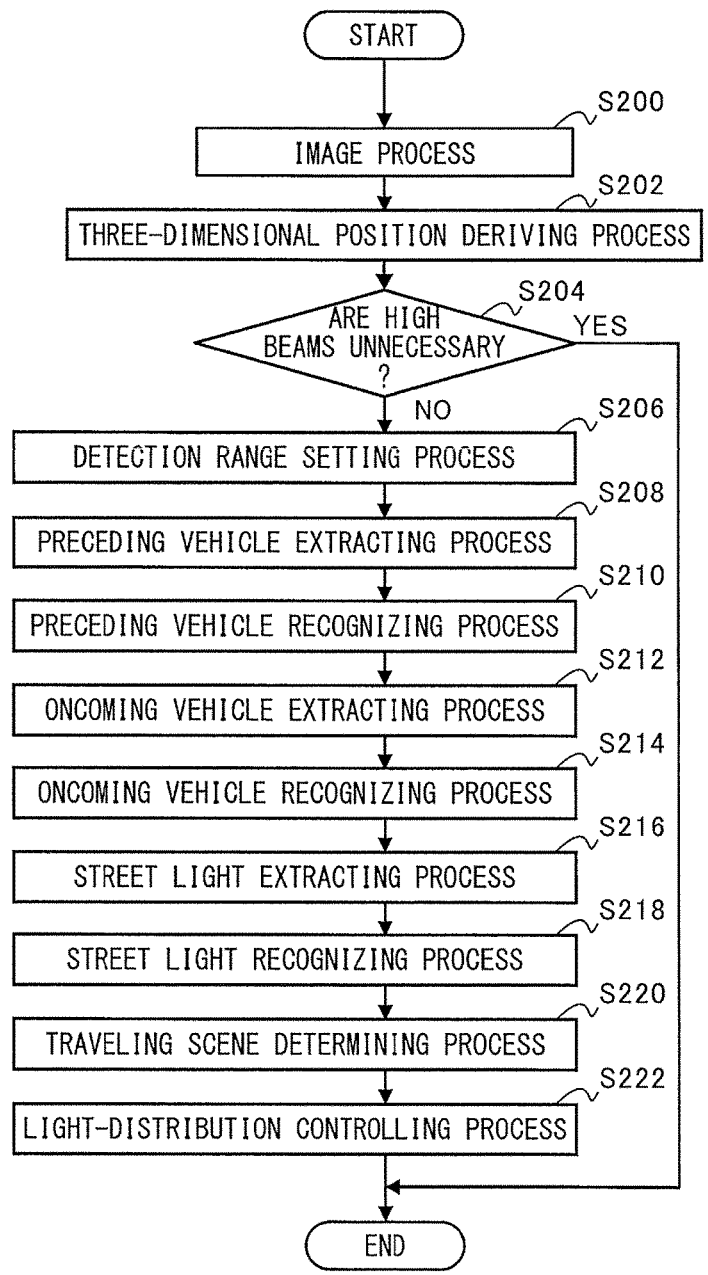
FIG. 3 is a flowchart illustrating an example of a flow of a vehicle exterior environment recognition process.

FIG. 3 is a flowchart illustrating an example of a flow of the vehicle exterior environment recognition process. In the vehicle exterior environment recognition process, the image processor 160 may process the images obtained from the two image-capturing units 110 (S200), the three-dimensional position deriving unit 162 may derive the three-dimensional positions from an image (S202), and the necessity determiner 166 may make a determination as to whether the high beams of the headlamps is necessary (S204). The vehicle exterior environment recognition process may end when a determination is made by the necessity determiner 166 that the high beams are unnecessary (YES in S204).

When a determination is made by the necessity determiner 166 that the high beams are necessary (NO in S204), the detection range setter 168 may set a detection range for each of the tail lamps, the headlamps, and the street lights in the acquired image (S206), the preceding vehicle extractor 170 may extract the tail lamps from the preceding vehicle detection range (S208), and the preceding vehicle recognizer 172 may recognize the preceding vehicle (S210). In addition, the oncoming vehicle extractor 174 may extract the headlamps from the oncoming vehicle detection range (S212), and the oncoming vehicle recognizer 176 may recognize the oncoming vehicle (S214). The street light extractor 178 may extract the street lights from the street light detection range (S216), and the street light recognizer 180 may recognize the street lights (S218). Further, the traveling scene determiner 182 may make a determination, from information such as positional information of the street lights, as to whether a traveling scene is a traveling scene in which the application of the high beams is possible (S220), and the light-distribution controller 184 may execute the light-distribution control of the headlamps, on the basis of the preceding vehicle, the oncoming vehicle, and the traveling scene (S222). The vehicle exterior environment recognition process may end following the execution of the light-distribution control. In the following, a description is given in detail of each of the processes.

[Image Process S200]

The image processor 160 may obtain the luminance image from each of the two image-capturing units 110, and derive the parallax with use of the so-called pattern matching. The pattern matching may involve searching a block corresponding to any block extracted from one of the luminance images in the other of the luminance images. The block may be, for example but not limited to, an array of four horizontal pixels by four vertical pixels. As used herein, the term "horizontal" refers to a lateral direction of a screen of the captured image, and the term "vertical" refers to a vertical direction of the screen of the captured image.

As the pattern matching, a luminance (i.e., a Y color-difference signal) may be compared, between the two luminance images, per block that indicates any image position. Non-limiting examples of such a luminance comparison method may include SAD (Sum of Absolute Difference) that obtains luminance differences, SSD (Sum of Squared intensity Difference) that uses the squared differences, and ZNCC (Zero-mean Normalized Cross Correlation) that obtains similarity of variance obtained as a result of subtraction of an average luminance value from a luminance value of each pixel. The image processor 160 may perform the foregoing parallax deriving process, performed on a block basis, for all of the blocks in the detection region. The detection region may be, for example but not limited to, an array of 600 horizontal pixels by 180 vertical pixels. In this implementation, each block may include the array of four horizontal pixels by four vertical pixels; however, any number of pixels may be set for each block.

The image processor 160 derives the parallax per block, i.e., derives the parallax on a detection resolution basis. However, the image processor 160 may have difficulties in recognizing the block in terms of which part of a three-dimensional object that block belongs and in terms of a type of that three-dimensional object. Hence, the parallax is derived independently on the detection resolution basis (e.g., on the block basis) with respect to the detection region, not on a three-dimensional object basis. Note that the image, in which information on the thus-derived parallax (equivalent to a depth distance z to be described later) is associated with the luminance images, is hereinafter referred to as a distance image.

Figure 4A:
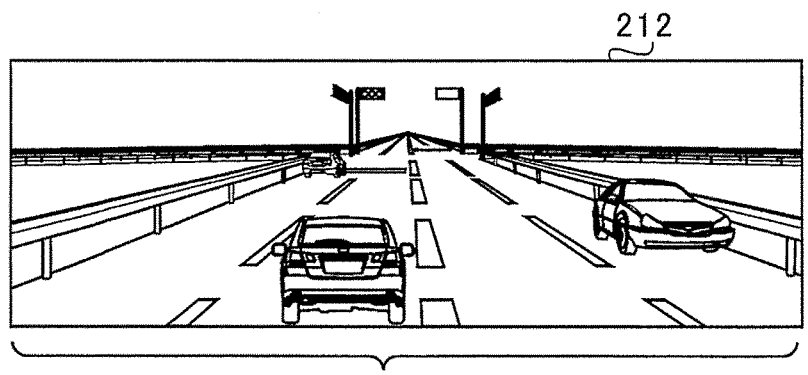
FIG. 4A and FIG. 4B respectively describe a luminance image and a distance image.
Figure 4B:
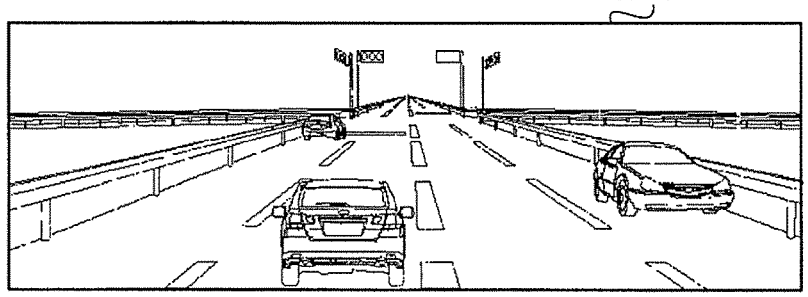

FIG. 4A and FIG. 4B respectively describe the luminance image 212 and the distance image 214. FIG. 4A describes a non-limiting example in which the luminance image 212 as illustrated in FIG. 4A is generated for an image region 216 by means of the two image-capturing units 110. Note that FIG. 4A schematically illustrates only one of the two luminance images 212 generated by the respective image-capturing units 110 for easier understanding. In this implementation, without limitation, the image processor 160 may obtain the parallax for each of the blocks from the luminance images 212 to form the distance image 214 as illustrated in FIG. 4B. Each of the blocks in the distance image 214 may be associated with the parallax of the corresponding block. For description purpose, each of the blocks for which the parallax is derived is denoted by a black dot.

[Three-Dimensional Position Deriving Process S202]

Thereafter, the three-dimensional position deriving unit 162 may convert, on the basis of the distance image 214 generated by the image processor 160, the parallax information for each of the blocks in the image region 216 into information on the three-dimensional position in real space, with use of a so-called stereo method. The information on the three-dimensional position may include pieces of information on a horizontal distance x, a height y, and the depth distance (a relative distance) z. The stereo method may involve deriving, from the parallax in the distance image 214 of any part of the three-dimensional object (a pixel or the block including the pixels), the depth distance z from the image-capturing units 110 to that part of the three-dimensional object with use a triangulation method. Upon deriving the three-dimensional position, the three-dimensional position deriving unit 162 may derive the height y from a road surface of any part of the three-dimensional object, on the basis of the depth distance z of the part of the three-dimensional object and on the basis of a detection distance in the distance image 214 from a point on the road surface to the part of the three-dimensional object. The point on the road surface is located at a position that is the same in depth distance z as the part of the three-dimensional object. The three-dimensional position deriving unit 162 may further associate the thus-derived three-dimensional position with the distance image 214 again. Note that various known techniques may be applied to the processes of deriving the depth distance z and identifying the three-dimensional position and will not be described in detail.

[Necessity Determining Process S204]

Thereafter, the necessity determiner 166 may make a determination as to whether the outside of the own vehicle 1 is light, e.g., as to whether the time is day or night. Specifically, the necessity determiner 166 may make a determination as to whether the high beams of the headlamps are necessary. The processes from S206 to S222 directed to the light-distribution control of the headlamps following the necessity determining process S204 may be skipped when a determination is made by the necessity determiner 166 that the high beams are unnecessary, thus making it possible to reduce a processing load. Hereinafter, a state in which the high beams are unnecessary is simply referred to as a "high beams unnecessary state".

Incidentally, the image-capturing units 110 may include an unillustrated exposure amount adjuster that adjusts an exposure amount on the basis of the vehicle exterior environment. The exposure amount may be calculated on the basis of sensitivity (a gain in this implementation without limitation), aperture, and exposure time. For example, the exposure amount adjuster may use a luminance distribution of a region in a part of the generated image (for example, a road surface region) to decrease the gain and the exposure time when a luminance of the region is high, and increase the gain and the exposure time when the luminance of the region is low. In other words, the exposure amount adjuster may adjust the gain and the exposure time so that the luminance suitable for the recognition of each of the various three-dimensional objects is obtained. Such an exposure amount adjuster may thus serve as an illuminance deriving unit that derives illuminance outside the own vehicle 1, meaning that the illuminance is low when the exposure amount is large, and that the illuminance is high when the exposure amount is small. In the following implementation, the illuminance outside the own vehicle 1 is expressed by the exposure amount, and a threshold of the illuminance (an illuminance threshold) is expressed by a threshold of the exposure amount (an exposure threshold). However, the illuminance and the illuminance threshold can be obviously based on, for example, illuminance obtained from an image and illuminance obtained from an illuminance sensor.

The necessity determiner 166 is thus able to sense the brightness outside the own vehicle 1 by referring to the exposure amount adjusted by the exposure amount adjuster of each of the image-capturing units 110. For example, the necessity determiner 166 may compare the exposure amount with a predetermined threshold, and may determine that the outside of the own vehicle 1 is light (i.e., the illuminance is high) and hence the high beams are not necessary (the high beams unnecessary state) when the gain is small and the exposure time is short (i.e., the exposure amount is small), and determine that the outside of the own vehicle 1 is dark (i.e., the illuminance is low) and hence the high beams are available when the gain is large and the exposure time is long (i.e., the exposure amount is large). Hereinafter, a state in which the high beams are available is simply referred to as a "high beams allowed state".

However, simply comparing the exposure amount with the threshold may possibly result in a concern that the lighting state of the headlamps becomes unstable. This may possibly occur when the determination on whether the state is the high beams unnecessary state or not is reversed frequently (when chattering occurs in the determination) on a frame basis in accordance with a fluctuation of the gain, the exposure time, or both, for example. To address this, the present implementation may aggregate, in time series, pieces of information that belong to a relatively long period of time, and make the determination on whether the state is the high beams unnecessary state on the basis of a result of the aggregation. Specifically, the integration value deriving unit 164 may derive an addition/subtraction value that is based on the exposure amount, and derive an integration value in which the addition/subtraction value is integrated for each predetermined cycle (e.g., integrated for each frame). For example, the addition/subtraction value may be a value within a range from minus 15 (−15) to plus 15 (+15), and the integration value may be in a range from 0 (zero) to 10000. On the basis of the thus-derived integration value, the necessity determiner 166 may determine, for example, that the state is the high beams unnecessary state when the integration value is small, and that the state is the high beams allowed state when the integration value is large. Further, a threshold directed to comparison of the integration value may involve a hysteresis characteristic to prevent the frequent reversal of the determination on whether the state is the high beams unnecessary state or not.

FIG. 5 describes an example of a determination process to be performed by the necessity determiner 166. The integration value deriving unit 164 may derive the negative addition/subtraction value when the exposure amount is less than the predetermined exposure threshold, and derive the positive addition/subtraction value when the exposure amount is equal to or greater than the predetermined exposure threshold. For example, the predetermined threshold may be a median of the exposure amount, such as a median of thresholds TH3 and TH4. Further, as illustrated in (a) of FIG.

5, the integration value deriving unit 164 may so derive the addition/subtraction value that the addition/subtraction value for the exposure amount that is larger than the exposure threshold becomes larger in absolute value than the addition/subtraction value for the exposure amount that is smaller than the exposure threshold, when the integration value is less than a predetermined third integration threshold. For example, the third integration threshold may be 5000. When the integration value is equal to or greater than the third integration threshold, the integration value deriving unit 164 may so derive the addition/subtraction value that the addition/subtraction value for the exposure amount that is larger than the exposure threshold becomes smaller in absolute value than the addition/subtraction value for the exposure amount that is smaller than the exposure threshold.

In another respect, the integration value deriving unit 164 may so derive the addition/subtraction value that the addition/subtraction value for the exposure amount in which the integration value is less than the predetermined third integration threshold becomes larger in absolute value than the addition/subtraction value for the exposure amount in which the integration value is equal to or greater than the predetermined third integration threshold, when the exposure amount is equal to or greater than the predetermined exposure threshold. When the exposure amount is less than the predetermined exposure threshold, the integration value deriving unit 164 may so derive the addition/subtraction value that the addition/subtraction value for the exposure amount in which the integration value is less than the predetermined third integration threshold becomes smaller in absolute value than the addition/subtraction value for the exposure amount in which the integration value is equal to or greater than the predetermined third integration threshold. Here, TH1 to TH6 each denote a threshold within an exposure amount range where TH1>TH2>TH3>TH4>TH5>TH6, meaning that the larger the value of the threshold is, the darker the environment outside the own vehicle 1 is.

In this implementation, the threshold for the exposure amount is divided finely to set the addition/subtraction value individually for each of the exposure amounts, making it possible to achieve the following example features. In a situation where the environment outside the own vehicle 1 makes a transition in brightness from light to dark (such as a transition from 4 pm to 8 pm) as illustrated in (b) of FIG. 5, the integration value becomes closer to the third integration threshold depending on the exposure amount as illustrated in (c) of FIG. 5, where the integration value is less than the third integration threshold (such as 5000). Here, the absolute value of the addition/subtraction value increases with the increase in the exposure amount, meaning that the integration value becomes closer to the third integration threshold more promptly as the environment outside the own vehicle 1 is darker. However, when the integration value becomes equal to or greater than the third integration threshold, the integration value remains near the third integration threshold due to a decrease in increase rate of the integration value where, for example, the exposure amount is less than the threshold TH1. Under such circumstances, when the environment outside the own vehicle 1 becomes sufficiently dark (i.e., the exposure amount ≥TH1) and thus the integration value becomes equal to or greater than a first integration threshold, the necessity determiner 166 may determine that the state is the high beams allowed state as illustrated in (d) of FIG. 5. For example, the first integration threshold may be 6000.

With this configuration, the integration value may become 10000 under a sufficiently-dark environment, may become 0 (zero) under a sufficiently-light environment, and may become around 5000 under an environment in which the brightness lies about midway between those environments. Hence, the determination as to whether the state is the high beams unnecessary state is not performed for a slightly-dark environment, such as an environment in which the exposure amount is near the threshold TH3 or TH4. If, for example, the addition/subtraction value is derived solely on the basis of the determination as to whether the environment depending on the exposure amount is sufficiently light or sufficiently dark regardless of the integration value, the integration value does not increase (i.e., remains zero) until the environment becomes sufficiently dark in a situation where the environment makes a transition from day to night. In this case, it is necessary to wait for the integration value to increase from 0 (zero) to 6000 following the transition to the night. In contrast, according to the present implementation, it is sufficient to wait for the integration value to increase from 5000 to 6000 owing to the integration value which is already increased to 5000 at the time of early evening, making it possible to make the determination as to whether the state is the high beams allowed state in a shorter time.

In a situation where the environment outside the own vehicle 1 makes a transition in brightness from dark (the integration value equals 10000) to light, the integration value becomes closer to the third integration threshold promptly as illustrated in (c) of FIG. 5. This is because, as illustrated in (a) of FIG. 5, the absolute value of the addition/subtraction value is set to be larger as the exposure amount becomes smaller (i.e., as the environment becomes lighter), and is set to be larger for a case where the integration value is large as compared with the third integration threshold than for a case where the integration value is small as compared with the third integration threshold. However, when the integration value becomes less than the third integration threshold, the integration value remains near the third integration threshold due to a decrease in decrease rate of the integration value where, for example, the exposure amount is equal to or greater than the threshold TH6. Under such circumstances, when the environment outside the own vehicle 1 becomes sufficiently light (i.e., the exposure amount <TH6) and thus the integration value becomes less than a second integration threshold, the necessity determiner 166 may determine that the state is the high beams unnecessary state as illustrated in (d) of FIG. 5. For example, the second integration threshold may be 4000. Thus, it is sufficient to wait for the integration value to decrease from 5000 to 4000 owing to the integration value which is already decreased to 5000 at dawn even if the environment makes a transition from night to day. Hence, it is possible to make the determination as to whether the state is the high beams unnecessary state in a shorter time, as compared with a case where the addition/subtraction value is derived solely on the basis of the determination as to whether the environment is sufficiently light or sufficiently dark in terms of the exposure amount regardless of the integration value.

Further, the configuration is employed that causes the integration value to remain near the third integration threshold and varies the addition/subtraction value depending on whether the integration value is equal to or greater than the third integration threshold or less than the third integration threshold. This configuration prevents the integration value from becoming equal to or greater than the first integration threshold unless the sufficiently-dark state continues. The third integration threshold is smaller than the first integration threshold and larger than the second integration threshold. The configuration also prevents the integration value from becoming less than the second integration threshold unless the sufficiently-light state continues. Thus, it is possible to prevent unnecessary overturn in the determination as to whether the state is the high beams unnecessary state even upon passing shadows or passing through tunnels during daytime, or traveling through town during the night. Hence, it is possible to achieve a stable determination result.

Note that the hysteresis characteristic is provided in the present implementation. Thus, the necessity determiner 166 may determine that the state is the high beams allowed state when the integration value becomes equal to or greater than the predetermined first integration threshold that may be, for example, 6000, and determine that the state is the high beams unnecessary state when the integration value becomes less than the second integration threshold. The second integration threshold is smaller than the first integration threshold, and may be, for example, 4000. Hence, when the integration value becomes equal to or greater than the first integration threshold and thus once the necessity determiner 166 determines that the state is the high beams allowed state, no determination is made that the state is the high beam unnecessary state, i.e., no reversal in the determination is made, until the integration value becomes less than the second integration threshold. Likewise, when the integration value becomes less than the second integration threshold and thus once the necessity determiner 166 determines that the state is the high beams unnecessary state, no determination is made that the state is the high beam allowed state until the integration value becomes equal to or greater than the first integration threshold.

When the necessity determiner 166 determines that the state is the high beams unnecessary state, the processes from S206 to S222 of the light-distribution control of the headlamps following the necessity determining process S204 may be skipped as described above. This means that a preceding vehicle extracting process S208, a preceding vehicle recognizing process S210, an oncoming vehicle extracting process S212, and an oncoming vehicle recognizing process S214 may not be executed during continuation of the high beams unnecessary state. However, a light-distribution process of the headlamps may possibly become unstable when a transition is made from the high beams unnecessary state to the high beams allowed state and thus execution of the foregoing processes from S208 to S214 is started suddenly. In this regard, a possibility of making the transition from the high beams unnecessary state to the high beams allowed state is high even upon the high beams unnecessary state when the integration value is equal to or greater than a predetermined value that may be, for example, 5500. Hence, to prevent the unstable light-distribution process, the preceding vehicle extracting process S208, the preceding vehicle recognizing process S210, the oncoming vehicle extracting process S212, and the oncoming vehicle recognizing process S214 may be executed in advance as an advance preparation for starting the light-distribution process of the headlamps.

As described above with reference to FIG. 5, the addition/subtraction value based on the exposure amount is integrated and the determination on whether the state is the high beam unnecessary state is made on the basis of the integration value, in the present implementation. In the following (1) to (9), processes of varying the integration value and any other factor depending on the vehicle exterior environment are described in order to reflect the actual vehicle exterior environment more to the foregoing technique according to the present implementation.

(1) The time of the day is undetermined upon start of driving (start-up) of a vehicle. Hence, the integration value may be forcibly set to the third integration threshold regardless of a value of the integration value at that time. The third integration threshold may be, for example, 5000. Further, regardless of the value of the integration value at that time, the determination result may be set to indicate that the state is the high beams unnecessary state. Here, the high beams unnecessary state may be maintained when the state is already the high beams unnecessary state, and the state may be switched to the high beam unnecessary state when the state is the high beam allowed state. With the configuration according to (1), it is possible to allow the necessity determiner 166 to make the determination as to whether the state is the high beams unnecessary state promptly.

(2) An auto light function of the vehicle may be utilized to vary the integration value. As used herein, the term "auto light function" may refer to a function in which the headlamps are automatically lighted when a detection value obtained by the illuminance sensor is less than a predetermined illuminance threshold, i.e., when the brightness outside the own vehicle 1 becomes insufficient. The high beams are unnecessary obviously in a situation where the automatic lighting of the headlamps is unnecessary. Thus, when the detection value obtained from the illuminance sensor for the auto light is equal to or greater than the predetermined illuminance threshold, i.e., when the automatic lighting of the headlamps is unnecessary, the integration value at that time may be forcibly set to the third integration threshold that may be 5000 in a case where the integration value at that time is equal to or greater than the third integration threshold. Further, the determination result may be set to indicate that the state is the high beams unnecessary state. However, only the determination result may be set to indicate that the state is the high beams unnecessary state without varying the integration value in a case where the integration value at that time is less than the third integration threshold. With the configuration according to (2), it is possible to allow the necessity determiner 166 to make the determination as to whether the state is the high beams unnecessary state promptly.

It is to be noted that control systems of the illuminance sensor and the headlamps may sometimes be independent from a control system of the vehicle exterior environment recognition apparatus 120 and thus a direct reference to the detection value obtained from the illuminance sensor may involve difficulties in some cases. In such cases, instead of making the determination as to whether the detection value obtained from the illuminance sensor for the auto light is equal to or greater than the predetermined illuminance threshold, the varying of the integration value, the switching of the determination results, or both may be performed on a condition that the auto light function is enabled (the main switch is at the auto light position) and that the low beams are not turned on.

(3) Not only the main switch but also the dimmer switch may be utilized to vary the integration value. For example, a situation where the dimmer switch is set to the position in which the use of the high beams is allowed can be regarded as a driver's intention that the driver wishes to set the high beams for the headlamps. However, some drivers wish to enable the HBA or the ADB constantly and thus always keep the dimmer switch to the position in which the use of the high beams is allowed. In view of such circumstances, it is difficult to determine that the driver wishes to turn on the high beams solely by the fact that the dimmer switch is at the position in which the use of the high beams is allowed.

To address this, a determination may be made that the driver intends to set the high beams for the headlamps not on the basis of the fact that the dimmer switch is routinely at the position in which the use of the high beams is allowed but on the basis of the fact that the dimmer switch is switched from the position in which the use of the high beams is not allowed to the position in which the use of the high beams is allowed. In other words, when the integration value is less than the predetermined value, the integration value may be varied to that predetermined value upon switching of the dimmer switch from the position in which the use of the high beams is not allowed to the position in which the use of the high beams is allowed. The predetermined value may be equal to or greater than the third integration threshold and less than the first integration threshold, and may be, for example, 5500. The integration value may not be varied, i.e., may be maintained, when the integration value is equal to or greater than the predetermined value. Note that a result of the determination as to whether the state is the high beams unnecessary state is unchanged. In the process according to (3), information based on hardware, i.e., the dimmer switch, is utilized, making it possible to achieve the process of varying the integration value without the necessity of integrating the addition/subtraction value that is based on the exposure amount. Specifically, it is possible to achieve the process of varying the integration value, by directly detecting the illuminance outside the own vehicle 1 with use of the illuminance sensor or any other detector without using the image-capturing units 110 and integrating the addition/subtraction value that is based on the detected illuminance.

In the process according to (3), the predetermined value may be set to a value that is equal to or greater than the third integration threshold, i.e., may be slightly less than the first integration threshold. One reason is to promptly reflect the driver's intention to turn on the high beams. Further, one reason that the predetermined value is less than the first integration threshold is to prevent rough determination that the state is the high beams allowed state in a situation where, to enable the HBA or the ADB during daytime, the dimmer switch is switched to the position in which the use of the high beams is allowed. With the configuration according to (3), it is possible to allow the necessity determiner 166 to make the determination as to whether the state is the high beams unnecessary state promptly.

(4) The integration value may be varied when the vehicle exterior environment is a particular environment. For example, in the cloudy early morning, the exposure amount may possibly continue to be equal to or greater than the threshold TH6 illustrated in (a) of FIG. 5 for a long time, which may possibly prevent prompt switching from the high beams allowed state to the high beams unnecessary state. To address this, the integration value may be varied to the third integration threshold when the integration value is equal to or greater than the third integration threshold, on a condition that the exposure amount continues to be less than a predetermined exposure threshold illustrated in (a) of FIG. 5 for a predetermined time threshold or more. For example, the predetermined exposure threshold may be the threshold TH5, and the predetermined time threshold may be a time period ranging from 5 minutes to 10 minutes. The predetermined time threshold may be the number of frames corresponding to the time period. The integration value may not be varied when the integration value is less than the third integration threshold. Note that, in either case, the determination result may be set to indicate that the state is the high beams unnecessary state.

(5) The integration value may be varied when the vehicle exterior environment is any other particular environment. As described above, the exposure amount adjuster may use a luminance distribution of a region in a part of the generated image (for example, a road surface region) to adjust the exposure amount. Under normal circumstances, the road surface often has a color between gray and black. However, the road surface becomes white in a particular situation such as after snowfall and thus becomes relatively high in luminance. Under such circumstances, the relationship "exposure amount ≥TH1" may possibly be met and thus the state may possibly be determined as the high beams unnecessary state even in a sufficiently-dark situation in which the determination that the state is the high beams allowed state should be made.

To address this, other than the road surface region to which reference is made to adjust the exposure amount, reference may be made to any region in the image and luminance of the region other than the road surface region may be obtained. For example, the region other than the road surface region may be a region equivalent to the sky, and the reference may be made to 100 pixels in the region. Further, when the luminance of the region satisfies a predetermined darkness condition, 4 (four) may be added to the integration value when the integration value upon the satisfaction of the darkness condition is less than the third integration threshold, and 2 (two) may be added to the integration value when the integration value upon the satisfaction of the darkness condition is equal to or greater than the third integration threshold. For example, the predetermined darkness condition may be a situation where the number of pixels, in which the luminance is less than a predetermined value (such as 10 on a scale from 1 to 256), is equal to or greater than a predetermined value (such as 90). Note that such a process may be carried out only when a predetermined condition is satisfied, such as when the exposure amount is equal to or greater than the threshold TH4. With the configuration according to (5), it is possible to solve a concern, even for a snow-covered road surface during the night, that the state is determined continuously as being the high beams unnecessary state for a long time unnecessarily.

(6) The process of integrating the integration value may be temporarily halted depending on the vehicle exterior environment. For example, when an obstacle such as the preceding vehicle and the oncoming vehicle is located immediately in front of the own vehicle 1, the exposure amount may sometimes become small even during the night due to an influence of tail lamps and stop lamps of the preceding vehicle, or due to an influence of reflection of the headlamps, or any other factor, of the own vehicle 1. To address this, the three-dimensional position derived from the image process S200 may be used to determine whether the depth distance relative to the three-dimensional object immediately in front of the own vehicle 1 is less than a predetermined distance threshold, and updating of the integration value, i.e., the integration of the integration value, may not be performed when the depth distance relative to the three-dimensional object immediately in front of the own vehicle 1 is less than the predetermined distance threshold. The predetermined distance threshold may be, for example, 10 meters.

Note that employing the process according to (6) may result in absence of a variation in the integration value in a situation where the environment makes a transition from day to night upon a traffic jam. This, however, is unproblematic in that the high beams are unnecessary in the first place when the preceding vehicle or any other obstacle is located closely to the own vehicle 1. With the configuration according to (6), it is possible to prevent the state from being determined unnecessarily as the high beams unnecessary state due to the influence of the tail lamps and the stop lamps of the preceding vehicle, or due to the influence of reflection of the headlamps, or any other factor, of the own vehicle 1.

(7) The process of integrating the integration value may be temporarily halted depending on the vehicle exterior environment in any other situation. For example, when the own vehicle 1 stops at the front of an intersection during the night and thus the headlamps of the oncoming vehicle are bright, the exposure amount may sometimes become small due to an influence of the headlamps of the oncoming vehicle. To address this, the updating of the integration value, i.e., the integration of the integration value, may not be performed when the own vehicle 1 is stopped and a determination is made that the oncoming vehicle is present ahead of the own vehicle 1. With the configuration according to (7), it is possible to prevent the state from being determined unnecessarily as the high beams unnecessary state due to the influence of the headlamps of the oncoming vehicle.

(8) The process of integrating the integration value may be temporarily halted in any other situation. For example, even during the daytime, the exposure amount may possibly increase and thus the state may sometimes be determined as the high beams allowed state irrespective of the vehicle exterior environment when the optical axes of the image-capturing units 110 are interrupted. Further, the image-capturing units 110 are susceptible to weather or any other factor and may involve difficulties in recognizing the preceding vehicle, etc., due to rainfall, fog, backlight, etc. To address this, the updating of the integration value, i.e., the integration of the integration value, may not be performed when a control performed by the image-capturing units 110 is determined as being temporarily prohibited, i.e., determined as "HALT". With the configuration according to (8), it is possible to prevent the state from being determined unnecessarily as the high beams allowed state even in a situation where the image-capturing units 110 fail to recognize the vehicle exterior environment normally.

(9) The thresholds of the exposure amount may be varied depending on the vehicle exterior environment. For example, the exposure amount may sometimes become small due to an influence of street lights when the own vehicle 1 travels through an urban area. To address this, each of the thresholds TH1 to TH6 illustrated in (a) of FIG. 5 may be decreased by a predetermined rate while a current scene is determined as an urban area traveling scene in a traveling scene determining process (S220) performed on a previous frame. The predetermined rate may be, for example, 10%. With the configuration according to (9), it is possible to prevent the state from being determined unnecessarily as the high beams unnecessary state due to the influence of street lights even upon traveling through the urban area.

[Detection Range Setting Process S206]

When a determination is made by the necessity determiner 166 that the state is the high beams allowed state (NO in S204), the detection range setter 168 may take resources for processes of detecting, from the acquired image, the preceding vehicle (such as the tail lamps), the oncoming vehicle (such as the headlamps), and the street lights to thereby determine ranges in which the three-dimensional objects are to be detected in more detail and with higher accuracy (i.e., detection ranges), in addition to a normal range directed to detection of the three-dimensional objects. By limiting, within the image, the ranges in which the three-dimensional objects are to be detected in more detail and with higher accuracy in addition to the normal detection range of the three-dimensional objects in this way, it is possible to reduce a processing time required to extract the preceding vehicle, the oncoming vehicle, etc., and to prevent an erroneous detection in regions in which presence of the preceding vehicle, the oncoming vehicle, etc. is unlikely in terms of the nature of the region. In the following, a description is given in detail of the detection ranges in which the three-dimensional objects are to be detected in more detail and with higher accuracy.

Figure 6:
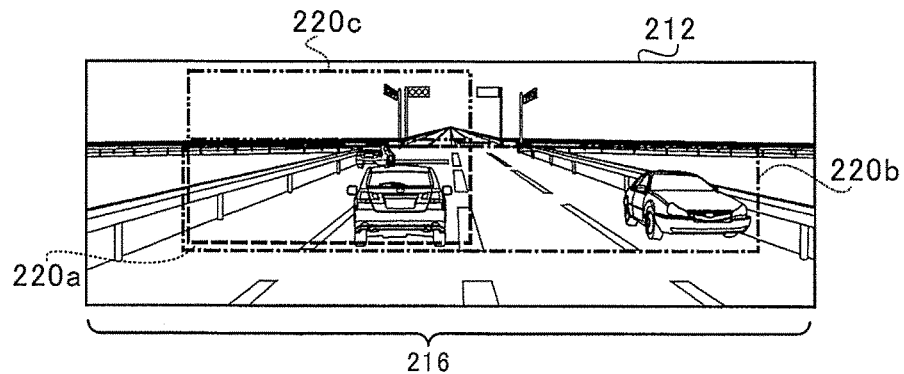
FIG. 6 describes detection ranges.

FIG. 6 is an explanatory view for describing the detection ranges. The detection range setter 168 may respectively set, at respective predetermined positions in the image region 216 which are illustrated in FIG. 6, a preceding vehicle detection range 220*a*, an oncoming vehicle detection range 220*b*, and a street light detection range 220*c* to the preceding vehicle, the oncoming vehicle, and the street lights each serving as a detection target. Note that the preceding vehicle detection range 220*a*, the oncoming vehicle detection range 220*b*, and the street light detection range 220*c* are respectively denoted by a rectangular broken line, a rectangular one-dot chain line, and a rectangular two-dot chain line. As can be appreciated from FIG. 6, the preceding vehicle detection range 220*a* is included in the oncoming vehicle detection range 220*b*. It can also be appreciated from FIG. 6 that the preceding vehicle detection range 220*a* and the oncoming vehicle detection range 220*b* are exclusive with respect to the street light detection range 220*c*.

The preceding vehicle detection range 220*a*, the oncoming vehicle detection range 220*b*, and the street light detection range 220*c* may be offsetable depending on the vehicle exterior environment, a traveling path, or any other factor. For example, when a road is curved or has a gradient, the preceding vehicle detection range 220*a*, the oncoming vehicle detection range 220*b*, and the street light detection range 220*c* may be offset depending on a level of the curve or the gradient. In an example where the traveling path is a left-hand curve, the detection range setter 168 may offset each of the preceding vehicle detection range 220*a*, the oncoming vehicle detection range 220*b*, and the street light detection range 220*c* to the left by an amount corresponding to the level of the curve of that traveling path. With this configuration, it is possible to set, as the detection ranges, respective positions in which presence of the preceding vehicle, presence of the oncoming vehicle, and presence of the street lights are most likely.

[Preceding Vehicle Extracting Process S208]

Thereafter, the preceding vehicle extractor 170 may extract the tail lamps from the preceding vehicle detection range 220*a* on the basis of a luminance, color information, and a three-dimensional position. Note that the tail lamps of the preceding vehicle are different in light amount from the headlamps of the oncoming vehicle and the street lights as described later. Under such circumstances, when images of the tail lamps are captured by the image-capturing units 110 on the basis of an exposure time that is directed to acquiring of the images of the tail lamps, the luminance of each of the headlamps and the street lights is saturated. Further, under such circumstances, capturing the images of the tail lamps by the image-capturing units 110 on the basis of an exposure time that is directed to acquiring of the images of the headlamps and the street lights leads to failure in detection of the tail lamps. To address these, the image-capturing units 110 may generate, at different frames, the images on the basis of at least two exposure times, i.e., a long exposure time and a short exposure time.

Figure 7A:
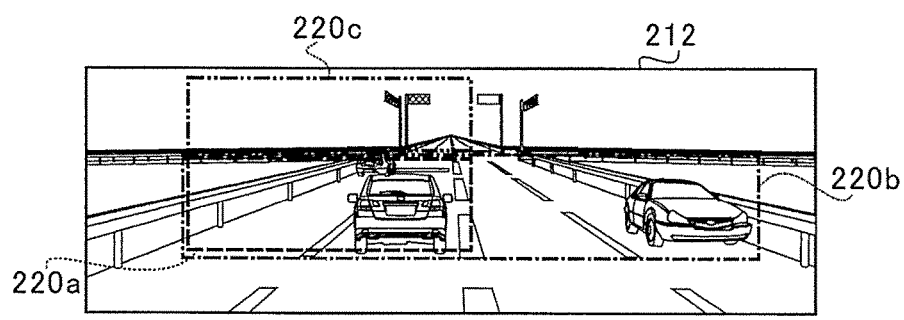
FIG. 7A and FIG. 7B describe luminance images that are different from each other in exposure time.
Figure 7B:
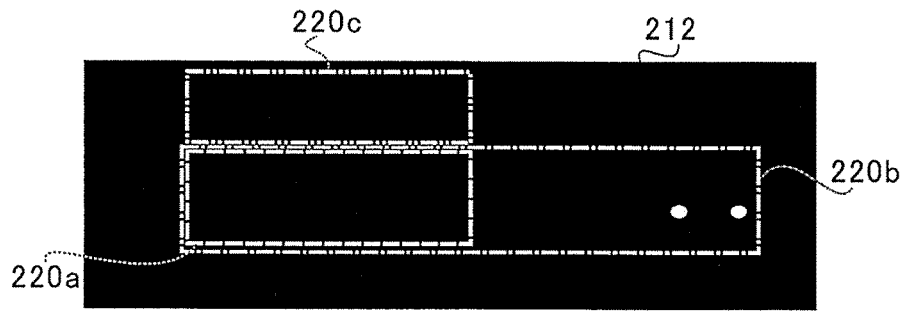

FIG. 7A and FIG. 7B describe the luminance images 212 that are different from each other in exposure time. FIG. 7A illustrates an example of the luminance image 212 generated on the basis of the long exposure time, and FIG. 7B illustrates an example of the luminance image 212 generated on the basis of the short exposure time. Hence, use of the luminance image 212 illustrated in FIG. 7A involves a possibility that the luminance of each of the headlamps and the street lights is saturated but makes it possible to properly extract the tail lamps, whereas use of the luminance image 212 illustrated in FIG. 7B involves a possibility that the tail lamps are unextractable but makes it possible to properly extract the headlamps and the street lights.

The preceding vehicle extractor 170 may also perform grouping of the pixels in the preceding vehicle detection range 220a. Specifically, the preceding vehicle extractor 170 may perform the grouping of the pixels in the preceding vehicle detection range 220a by collecting the pixels that satisfy conditions, i.e., the pixels in which their respective pieces of color information (RGB or YUV) fall within a predetermined color range that indicates red, and in which their respective three-dimensional positions are within a predetermined distance range (such as falls within 1.5 pixels) with respect to each other. Here, the preceding vehicle extractor 170 may perform grouping of the pixels located within a rectangular region. The rectangular region may be defined by horizontal lines and vertical lines, and include all of the pixels that satisfy the foregoing conditions. The thus-grouped pixels may be handled as a tail lamp candidate that serves as a candidate identifiable as the tail lamp. The tail lamp candidate following the grouping may contain basic characteristic amounts such as: coordinates of left, right, top, and bottom parts of the group, i.e., coordinates of four corners of the group; the number of pixels in the group; a maximum luminance value in the group; a minimum luminance value in the group, and an average depth distance, i.e., an average parallax, of the group.

In the present implementation, the preceding vehicle extractor 170 may exclude the grouped pixels from the tail lamp candidate when the grouped pixels satisfy any of the following exclusion conditions. For example, the exclusion conditions may include: a difference (a size) between the coordinates of the left, right, top, and bottom parts of the group which is equal to or less than a predetermined value (for example, 2 pixels); a difference (a size) between the coordinates of the left, right, top, and bottom parts of the group which is equal to or greater than a predetermined value (which may be determined by the depth distance); and the number of pixels in the group which is equal to or less than a predetermined value (for example, 2).

Note that a red reflector may sometimes be included in the preceding vehicle detection range 220a in addition to the tail lamps. In this case, it is difficult to distinguish between the tail lamps and the red reflector solely on the basis of the color information. However, the tail lamps each become higher in luminance than the red reflector under the condition where the depth distance is the same, due to a difference that the red reflector utilizes light reflection whereas the tail lamps each emit light by itself. In the present implementation, such characteristics are utilized to distinguish between the tail lamps and the red reflector.

Figure 8:
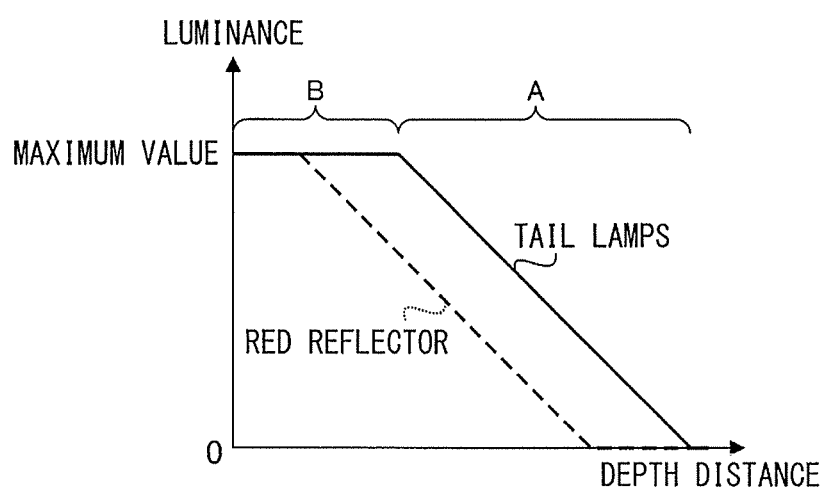
FIG. 8 is an explanatory diagram for describing a relationship between tail lamps and a red reflector.

FIG. 8 describes a relationship between the tail lamp and the red reflector. As can be appreciated from FIG. 8, the luminance of the tail lamp denoted by a solid line and the luminance of the red reflector denoted by a broken line each decrease with an increase in the depth distance. However, it can also be appreciated from FIG. 8 that the tail lamp is higher in luminance than the red reflector at any depth distance. For description purpose, a relationship between the depth distance and the luminance is illustrated linearly in FIG. 8; however, the relationship is often nonlinear in practice. The preceding vehicle extractor 170 may exclude the grouped pixels from the tail lamp candidate, when the preceding vehicle extractor 170 determines, on the basis of the depth distance and the luminance of the tail lamp candidate, that the relationship of the depth distance and the luminance corresponds to the relationship according to the red reflector illustrated in FIG. 8.

As described above, the tail lamps are extracted from the preceding vehicle detection range 220a in the present implementation. However, the depth distance in the preceding vehicle detection range 220a can be extremely long, e.g., may range from zero meter to hundreds of meters, and thus it is necessary to make the exposure time long in order to recognize the tail lamps far away from the own vehicle 1. Under such circumstances, it is possible to identify the relationship between the depth distance and the luminance and thus the grouped pixels may be distinguishable as, for example, the red reflector, for the tail lamps located in a region A in which the depth distance is relatively long. For the tail lamps located in a region B in which the depth distance is short, however, the luminance is saturated to the maximum as illustrated in FIG. 8 and thus the relationship between the depth distance and the luminance is unidentifiable. Note that the tail lamp candidate itself is extractable, due to a fact that a part at which the luminance saturates is a light-emitting part of the tail lamp and a red part is still present around the light-emitting part.

Further, the tail lamps are lower in luminance than the headlamps of the oncoming vehicle, meaning that the difference in luminance between the tail lamps and the red reflector is small in the first place. Thus, in the region B of FIG. 8, the decrease in the luminance difference between the tail lamps and the red reflector with the decrease in the depth distance eventually results in the luminance saturation for both the tail lamps and the red reflector. Hence, the tail lamps and the red reflector may become indistinguishable from each other in a situation where the depth distance is short as described above.

Note that the red reflector is used not only as a display that calls driver's attention while driving but also as a reflector for a vehicle. It is therefore desirable that the high beams be applied to a vehicle in which the tail lamps are unlighted, such as a parked vehicle, while preventing the running preceding vehicle from receiving glare attributed to the high beams.

To give one example, parallel parking on a road is common in residential area in the United States, meaning that an erroneous detection of the red reflector and the tail lamps may possibly raise a concern, for example, that the high beams may not be turned on at a place with many vehicles parked on the road, or that hunting occurs in which the high beams and the low beams are switched in an alternating fashion repeatedly. To avoid such circumstances, one method may be to utilize a shape of the tail lamp candidate. Another method may be to utilize a speed ($\neq 0$) of the tail lamp candidate. The former, however, involves difficulties in that the red reflector is often not excludable by means of the shape, whereas the latter involves difficulties in performing highly accurate recognition due to, for example, the presence of preceding vehicle that remains stationary.

In conclusion, it is desirable that the tail lamps and the red reflectors be distinguished on the basis of the relationship between the depth distance and the luminance. Thus, as described above, the present implementation uses, in addition to the luminance image 212 illustrated by way of example in FIG. 7A which is directed to the extraction of the tail lamps and based on the long exposure time, the luminance image 212 illustrated by way of example in FIG. 7B which is directed to the extraction of the headlamps and the street lights and generated at the frame different from the frame at which the luminance image 212 of FIG. 7A is generated.

Figure 9A:
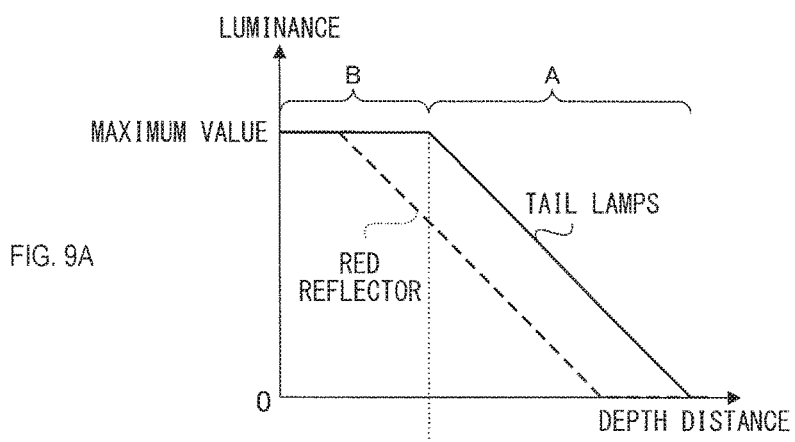
FIGS. 9A and 9B are another explanatory diagram for describing the relationship between the tail lamps and the red reflector.
Figure 9B:
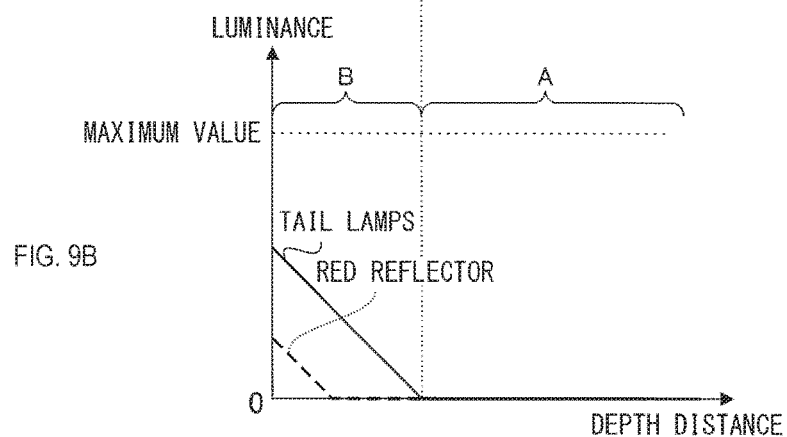

FIG. 9 is another explanatory diagram for describing the relationship between the tail lamps and the red reflector. The preceding vehicle extractor 170 may first use the luminance image 212 of FIG. 7A. Hereinafter, the luminance image 212 illustrated by way of example in FIG. 7A is referred to as a first luminance image 212. The first luminance image 212 has a relationship between the luminance and the depth distance of the block (i.e., the block of the tail lamp candidate) as illustrated in (a) of FIG. 9, making it possible to distinguish between the tail lamps and the red reflector on the basis of the luminance and the depth distance of the block and extract the tail lamps of the preceding vehicle, for a region A.

When the depth distance of the block is less than a predetermined distance threshold, the preceding vehicle extractor 170 may use the luminance image 212 of FIG. 7B which is shorter in exposure time than the first luminance image 212. Hereinafter, the luminance image 212 illustrated by way of example in FIG. 7B is referred to as a second luminance image 212. The predetermined distance threshold may be, for example, 150 meters. The second luminance image 212 has a relationship between the luminance and the depth distance of the block as illustrated in (b) of FIG. 9, making it possible to distinguish between the tail lamps and the red reflector on the basis of the luminance and the depth distance of the block and extract the tail lamps of the preceding vehicle, also for a region B that is shorter in depth distance than the region A.

For the preceding vehicle detection range 220a used upon the extraction of the tail lamps from the second luminance image 212 that is based on the short exposure time, the preceding vehicle detection range 220a used upon the extraction of the tail lamps from the first luminance image 212 that is based on the long exposure time may be utilized as it is, or may be utilized after being slightly enlarged by, for example, 1.1 times. Specifically, as the preceding vehicle detection range 220a, the tail lamps are to be extracted from a range based on the already-derived preceding vehicle detection range 220a in the second luminance image 212 that is based on the short exposure time. In this regard, a position of the preceding vehicle moves little between frames owing to the sufficiently-high frame rate and a small relative speed between the preceding vehicle and the own vehicle 1. Hence, it is possible to use, in a diverted fashion, the preceding vehicle detection range 220a also for the luminance image 212 that is based on the different frame without raising a concern. With this configuration, it is possible to avoid the necessity of performing the derivation of the preceding vehicle detection range 220a again and thereby to reduce a processing load.

In the following, a description is given of a specific but non-limiting process in which the preceding vehicle extractor 170 extracts the tail lamps from the second luminance image 212 that is based on the short exposure time. First, the preceding vehicle extractor 170 may use a maximum value of a red component of the tail lamp candidate (e.g., an R component among RGB components) as a characteristic amount of the tail lamp. A calculation of the maximum value may be performed only on the pixels that satisfy a condition of "$R \geq G$ and $R \geq B$".

Further, a value accumulated on the basis of scores over a plurality of frames may be used in order to address variations in brightness of the tail lamp which may occur depending on types of vehicles and environments. Specifically, a tail lamp point and a non tail lamp point may be accumulated for each frame. The tail lamp point indicates likelihood that the tail lamp candidate is the tail lamp, and the non tail lamp point indicates likelihood that the tail lamp candidate is not the tail lamp. The tail lamp point and the non tail lamp point each may be set to 0 (zero) for its initial value.

Figure 10:
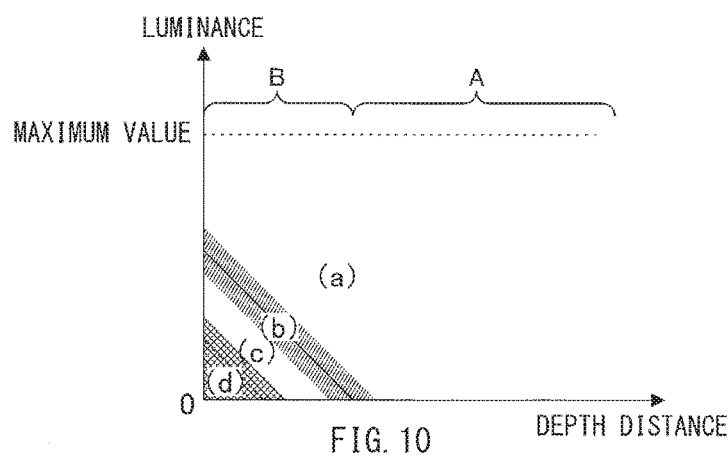
FIG. 10 describes points to be accumulated by a preceding vehicle extractor.

FIG. 10 describes the points to be accumulated by the preceding vehicle extractor 170. As can be appreciated from FIG. 10, four regions (a) to (d) may be set on the basis of the relationship in depth distance and luminance between the tail lamp and the red reflector as illustrated in (b) of FIG. 9. In the present implementation, the hatched region (b) equivalent to the relationship between the depth distance and the luminance of the tail lamp may be used to determine that it is likely that the tail lamp candidate is the tail lamp, and the cross-hatched region (d) equivalent to the relationship between the depth distance and the luminance of the red reflector may be used to determine that it is not likely that the tail lamp candidate is the tail lamp. Further, the region (c) between the regions (b) and (d) may be used to determine that the likelihood of the tail lamp candidate is uncertain, and the region (a) in which the luminance is higher than the luminance in the region (b), i.e., the luminance is high to the extent of the luminance of the stop lamp, may be used to determine that it is most likely that the tail lamp candidate is the tail lamp. Note that the regions are illustrated linearly with respect to the depth distance for convenience of description in FIG. 10; however, the depth distance may be divided into a plurality of depth distances to allow those regions to be discretized (to be provided stepwise) for each of the depth distances.

The preceding vehicle extractor 170 may add 5 points to the tail lamp point when the relationship between the depth distance and the luminance of the tail lamp candidate (the block) is determined as falling in the region (a), and may add 1 (one) point to the tail lamp point when the relationship between the depth distance and the luminance of the tail lamp candidate (the block) is determined as falling in the region (b). The preceding vehicle extractor 170 may refrain from performing any process when the relationship between the depth distance and the luminance of the tail lamp candidate (the block) is determined as falling in the region (c), and may add 1 (one) point to the non tail lamp point when the relationship between the depth distance and the luminance of the tail lamp candidate (the block) is determined as falling in the region (d). The tail lamp point and the non tail lamp point thus calculated may be used in the preceding vehicle recognizing process S210 to be described later. Specifically, the tail lamp point and the non tail lamp point may be used upon correction of the determined preceding vehicle after a determination is made by the preceding vehicle recognizer 172 that a candidate identifiable as the preceding vehicle, i.e., a preceding vehicle candidate, is the preceding vehicle. The correction of the preceding vehicle is described in greater detail later in "Preceding Vehicle Recognizing Process S210".

Note that the tail lamps and the later-described headlamps are extracted on the basis of the characteristic amount in the images such as the luminance and the color information. In the following, a description is given based on the tail lamps for simplification purpose. When the characteristic amount fluctuates around its threshold, the extraction of the tail lamps itself may possibly become unstable. For example, a situation may possibly occur repeatedly in which tail lamps of the actual preceding vehicle are determined as being the tail lamps at any frame but are determined as not being the tail lamps at any other frame. The unstable extraction of the tail lamps in this manner may possibly bring about the hunting in which the high beams and the low beams are switched in an alternating fashion repeatedly for the light-distribution control of the headlamps of the own vehicle 1.

Further, the three-dimensional object that does not emit light by itself, such as a reflector located in the vicinity of a traveling path, may cause a variation in characteristic amount in the images depending on how that three-dimensional object is irradiated with light of the headlamps of the own vehicle 1. This possibly makes it easier to cause an erroneous detection of the three-dimensional object as the tail lamps (i.e., the preceding vehicle) or the headlamps (i.e., the oncoming vehicle). For example, in a situation where the own vehicle 1 is set to apply the high beams and the three-dimensional object may be erroneously detected as being the tail lamps (the preceding vehicle) due to the reflection of the high beams from the three-dimensional object, the high beams are switched to the low beams to prevent the application of the high beams to the preceding vehicle. However, the switching from the high beams to the low beams makes the reflection of the high beams disappear, allowing the three-dimensional object to be no longer recognized as the tail lamps. When the three-dimensional object is no longer recognized as the tail lamps, the own vehicle 1 is set to apply the high beams again, resulting in the possible occurrence of hunting.

To address the possible occurrence of hunting, one method may be to perform countermeasures on the light-distribution control after the recognition of the preceding vehicle, the oncoming vehicle, or both. However, the light-distribution control itself may have to be made complex when the recognition as a basis of the light-distribution control itself is unstable, leading to a lack of robustness.

Hence, the present implementation may perform, at the time of the extraction of the tail lamps or other illuminators, a process that combines the recognition process with a hysteresis characteristic. Specifically, the present implementation may change thresholds used to compare the characteristic amount, depending on whether a target to be extracted is irradiated with the high beams.

For example, the threshold may be set higher, i.e., more stringent, for a region irradiated with the high beams than for a region not irradiated with the high beams to prevent the erroneous detection of the tail lamps or other illuminators. Alternatively, the threshold may be set lower, i.e., more flexible, for the region not irradiated with the high beams than for the region irradiated with the high beams to allow for easier detection of the tail lamps or other illuminators. With this configuration, it is possible to extract the tail lamps or other illuminators appropriately and prevent the occurrence of hunting.

To change the thresholds depending on whether the target to be extracted is irradiated with the high beams, the region irradiated with the high beams is determined first.

Figure 11:
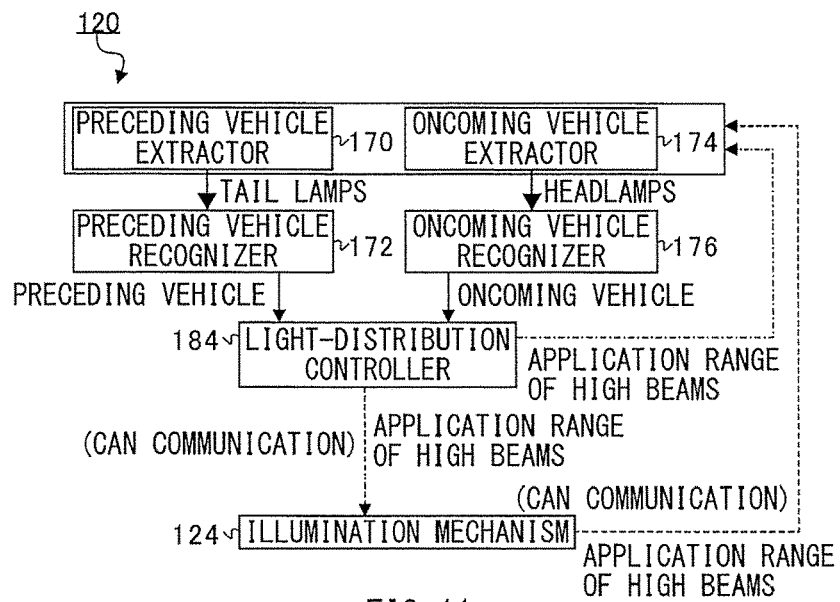
FIG. 11 is a functional block diagram for describing a light-distribution control of headlamps.

FIG. 11 is a functional block diagram for describing the light-distribution control of the headlamps. In the present implementation, the preceding vehicle extractor 170 and the oncoming vehicle extractor 174 may respectively extract the tail lamps and the headlamps. The preceding vehicle recognizer 172 and the oncoming vehicle recognizer 176 may respectively recognize the preceding vehicle and the oncoming vehicle on the basis of the extracted tail lamps and the extracted headlamps. The light-distribution controller 184 may determine, on the basis of information obtained from the recognition, distribution of light of the headlamps, i.e., a range of application of the high beams or the necessity of the application of the high beams. The illumination mechanism 124 may apply the high beams, on the basis of the application range of the high beams obtained through controller area network (CAN) communication denoted by a broken line.

Note that a delay in the CAN communication or any other factor may become an influential factor as described below, if the preceding vehicle extractor 170 acquires, through the CAN communication as denoted by the broken line in FIG. 11, result information regarding which application range the illumination mechanism 124 has applied the high beams and changes the thresholds as described above on the basis of the acquired result information.

To give one example, the light-distribution controller 184 transmits, when recognizing the preceding vehicle, instructions on switching of the states of the headlamps from the high beams to the low beams for the region in which the preceding vehicle is recognized. The illumination mechanism 124 switches the states of the headlamps from the high beams to the low beams in accordance with the instructions. However, due to the delay in CAN communication performed from the light-distribution controller 184 to the illumination mechanism 124 and from the illumination mechanism 124 to the preceding vehicle extractor 170, the preceding vehicle extractor 170 and the oncoming vehicle extractor 174 do not receive the instructions yet and thus only have past information that the application of the high beams is currently carried out by the illumination mechanism 124 at the time when the light-distribution controller 184 has issued the instructions on the switching of the states of the headlamps from the high beams to the low beams.

The foregoing example may possibly result in a situation that, even for the subsequent frame, the preceding vehicle extractor 170 extracts the tail lamps while the threshold for the relevant region is still high, on the basis of the past information that the headlamps are set to the high beams. In this situation, the extracted tail lamps may possibly be lost in the subsequent frame.

To address this, the preceding vehicle extractor 170 acquires the result information regarding which application range the illumination mechanism 124 has applied the high beams through the CAN communication as illustrated by the broken line in FIG. 11. The preceding vehicle extractor 170 also acquires, as denoted by a one-dot chain line in FIG. 11, information regarding which application range the light-distribution controller 184 has instructed a recipient to apply the high beams. Further, the preceding vehicle extractor 170 may change the thresholds by using both the pieces of information together.

Specifically, the preceding vehicle extractor 170 recognizes that the application range is a region to which the low beams are to be applied (i.e., the high beams are not to be applied), when either one of the result information regarding which application range the illumination mechanism 124 has applied the high beams (i.e., information executed by the illumination mechanism 124) and the information regarding which application range the light-distribution controller 184 has instructed the recipient to apply the high beams (i.e., information on the instructions issued by the light-distribution controller 184) indicates the application of the low beams (i.e., when none of them indicates the application of the high beams). For example, the preceding vehicle extractor 170 determines that the low beams are applied when either of those pieces of information indicates the application of the low beams in a case of the HBA. In a case of the ADB, the preceding vehicle extractor 170 determines that the low beams are applied when either of those pieces of information indicates the application of the low beams for any of angular ranges (i.e., any of angular regions).

With this configuration, it is possible to continue the detection of the preceding vehicle, the oncoming vehicle, or both in a stable manner by using a low value, i.e., a flexible value, for the threshold. This is possible, for one reason to be discussed below, even in the situation where the result information regarding which application range the illumination mechanism 124 has applied the high beams still indicates the application of the high beams due to the delay in CAN communication or any other factor following the change of the states of the headlights from the high beams to the low beams. One reason is that the information regarding which application range the light-distribution controller 184 has instructed the recipient to apply the high beams indicates the application of the low beams, i.e., does not indicate the application of the high beams. Hence, it is possible to reduce a possibility that the preceding vehicle (or the oncoming vehicle) is irradiated with the high beams.

Note that, in a case of the ADB, the information regarding which application range the illumination mechanism 124 has applied the high beams is obtained from information on a cut-off line angle. The cut-off line angle information may be transmitted from the illumination mechanism 124 and indicate an angle of application of the high beams. However, sole use of the cut-off line angle information may involve difficulties in identifying, in a simple fashion, which range in the luminance images 212 the high beams are applied.

Figure 12:
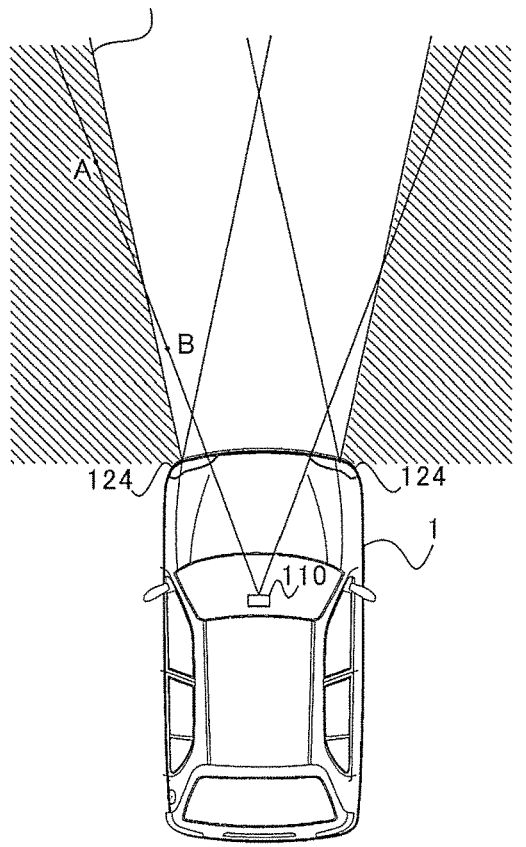
FIG. 12 is a top view for describing a relationship between a cut-off line angle and an angle of view.

FIG. 12 is a top view for describing a relationship between the cut-off line angle and an angle of view. FIG. 12 illustrates an example in which A and B are present at any same angle of view. In terms of the cut-off line angle, A and B are equal to each other in horizontal position in the luminance images 212 generated by the image-capturing units 110. However, A is irradiated with the high beams as denoted by hatching, whereas B is not irradiated with the high beams. This is due to a difference in position between the image-capturing units 110 and the headlamps (i.e., the illumination mechanisms 124) as illustrated in FIG. 12. Hence, as long as the depth distance of any block is sensed, it is possible for the preceding vehicle extractor 170 to determine, from geometric calculation, which range (i.e., block) in the luminance images 212 the high beams are applied as illustrated in FIG. 12, on the basis of the angle of view of that block and the depth distance of that block and the cut-off line angle.

Note that calculating whether the range (i.e., the block) is irradiated with the high beams on the basis of the angle of view and the depth distance of the block and the cut-off line angle as illustrated in FIG. 12 may incur an increase in processing load such as performing calculation based on trigonometric function and division. To address this, the present implementation may divide a distance range defined by the depth distance into a plurality of distance ranges and use a table for the respective distance ranges to reduce the processing load.

FIG. 13A and FIG. 13B describe a table directed to the cut-off line angles. FIGS. 13A and 13B illustrate an example in which a distance range defined by the depth distance is divided into 5 distance ranges and each of the distance ranges is associated with the single cut-off line angle. For example, the distance range defined by the depth distance may be divided into a distance range that ranges from 0 meter to 10 meters, a distance range that ranges from 10 meters to 30 meters, a distance range that ranges from 30 meters to 70 meters, a distance range that ranges from 70 meters to 200 meters, and a distance range that ranges from 200 meters onward. The cut-off line angle here may have resolution of, for example, 0.1 degrees. In the following, a description is given by referring to a comparison between the cut-off line angle based on the depth distance of 10 meters and the cut-off line angle based on the depth distance of 30 meters, each of which is denoted by a broken line in FIG. 13A. It can be appreciated from FIG. 13A that the cut-off line angles widen as the depth distance become short.

Hence, the present implementation may use the cut-off line angle based on the depth distance of 10 meters (which may have 24.9 degrees in the present implementation without limitation) as illustrated in FIG. 13B for the cut-off line angle in the images which ranges from the distance range of 10 meters to the distance range of 30 meters. The cut-off line angle based on the depth distance of 10 meters involves the shortest depth distance denoted by the broken line. Setting the cut-off line angle that is wider than the real cut-off line angle for all of the distance ranges defined by the depth distance, including the distance range that ranges from 10 meters to 30 meters as well, makes it possible to reduce a possibility that the preceding vehicle is irradiated with the high beams.

Note that the five distance ranges are not divided equally but are so divided that the distance ranges change nonlinearly as illustrated in FIG. 13B. One reason is that a difference between the cut-off line angle in the images and the real cut-off line angle increases sharply as the depth distance becomes short. Changing the distance ranges nonlinearly in this way makes it possible to set the appropriate cut-off line angles that are based on the depth distance.

As described above, the preceding vehicle extractor 170 may determine whether any block is irradiated with the high beams on the basis of the angle of view of that block and the depth distance of that block in the images and the cut-off line angle of the high beams. Further, the preceding vehicle extractor 170 may change, on the basis of a result of the determination, the thresholds directed to the determination as to whether the tail lamp is the tail lamp. The preceding vehicle extractor 170 may thereby extract the tail lamps of the preceding vehicle. The preceding vehicle recognizer 172 may recognize the preceding vehicle as described later on the basis of a result of the extraction.

Note that a situation may sometimes arise where a half of the preceding vehicle in a horizontal direction is irradiated with the high beams and the other half of the preceding vehicle in the horizontal direction is not irradiated with the high beams, due to a width of the preceding vehicle which extends in the horizontal direction to some extent, for example. In such a situation, a determination may be made on the basis of a rate of the application of the high beams. Specifically, a comparison may be made, with respect to the preceding vehicle candidate, between a rate in which the high beams are applied and a rate in which the high beams are not applied, and the determination may be made on the basis of the larger rate. Hence, for example, a determination may be made that the preceding vehicle candidate as a whole is irradiated with the high beams when the rate in which the high beams are applied is high, and a determination may be made that the preceding vehicle candidate as a whole is not irradiated with the high beams when the rate in which the high beams are not applied is high.

Incidentally, a determination can be made that the preceding vehicle candidate as a whole is not irradiated with the high beams when it is uncertain as to whether the preceding vehicle candidate as a whole is not irradiated with the high beams. In the present implementation, however, the table may be used to allow the cut-off line angles to be wider than the real cut-off line angles and thus to allow the determination to be made more easily that the high beams are not applied as described above. Hence, to prevent making a determination that the preceding vehicle candidate as a whole is not irradiated with the high beams too often, whether or not the preceding vehicle candidate as a whole is irradiated with the high beams may be determined in the present implementation simply depending on the rates of the application of the high beams.

With this configuration, it is possible to prevent the occurrence of hunting between the high beams and the low beams and thereby reduce the possibility that the preceding vehicle is irradiated with the high beams.

As described above, upon performing the light-distribution control of headlamps, it is desirable that the tail lamps of the preceding vehicle be identified accurately to prevent the preceding vehicle from being irradiated with the high beams. However, when a characteristic amount of the tail lamps fluctuates near a threshold, the extraction of the tail lamp itself becomes unstable, bringing about, in some cases, the hunting in which the high beams and the low beams are switched in an alternating fashion repeatedly. Further, the three-dimensional object that does not emit light by itself becomes high in luminance when the object is irradiated with light of the headlamps of the own vehicle, and becomes low in luminance when the object is not irradiated with the light. This also makes the extraction of the tail lamp itself unstable, bringing about the hunting in some cases. To prevent erroneous detection of the tail lamp, one measure may be to set a threshold directed to the extraction of the tail lamp to be higher, i.e., more stringent, for a region irradiated with the high beams than for a region not irradiated with the high beams. However, upon switching states of the headlamps from the high beams to the low beams, the threshold directed to a situation where the region is irradiated with the high beams may be used even though the three-dimensional object is no longer irradiated with the high beams, due to a delay in communication performed in a vehicle. In this case, the three-dimensional object may possibly be determined on the basis of the erroneous threshold. In contrast, according to one implementation of the technology, the preceding vehicle extractor 170 acquires the result information regarding which application range the illumination mechanism 124 has applied the high beams, and also acquires the information regarding which application range the light-distribution controller 184 has instructed the recipient to apply the high beams. Further, the preceding vehicle extractor 170 may change the thresholds by using both the pieces of information together. Hence, it is possible for the vehicle exterior environment recognition apparatus 120 to appropriately set the threshold, and thus to increase identification accuracy of the tail lamps of the preceding vehicle.

[Preceding Vehicle Recognizing Process S210]

Thereafter, the preceding vehicle recognizer 172 may perform grouping of the tail lamps extracted by the preceding vehicle extractor 170, and recognize the preceding vehicle in the preceding vehicle detection range 220a.

Specifically, the preceding vehicle recognizer 172 may perform the grouping of the tail lamps and recognize the grouped tail lamps as the preceding vehicle candidate when all of the following conditions are satisfied. For example, the conditions may include: whether a distance in the images between the tail lamps (the groups) falls within a distance range in which those tail lamps are determinable as belonging to the same vehicle, e.g., whether the distance is longer than the predetermined distance range in the preceding vehicle extracting process S208; whether a difference in the average depth distance (the average parallax) of the tail lamps falls within a distance range in which those tail lamps are determinable as belonging to the same vehicle; and whether a proportion of the maximum luminance value falls within a predetermined range.

The thus-grouped preceding vehicle candidate may take over the basic characteristic amounts of the tail lamps before the grouping. For example, coordinates of left, right, top, and bottom parts of the preceding vehicle candidate, i.e., coordinates of four corners of the preceding vehicle candidate, may take over coordinates that are equivalent to those located outward of the preceding vehicle candidate among coordinates of left, right, top, and bottom parts of each of the tail lamps, i.e., coordinates of four corners of each of the tail lamps. Further, a maximum luminance value and a minimum luminance value of the preceding vehicle candidate may respectively take over larger one of the maximum luminance values and larger one of the minimum luminance values of the tail lamps. Moreover, an average depth distance of the preceding vehicle candidate may take over shorter one of the average depth distances of the tail lamps, i.e., may take over larger one of the average parallaxes of the tail lamps. The preceding vehicle recognizer 172 may also count the number of tail lamps included in the preceding vehicle candidate.

Further, the preceding vehicle recognizer 172 may make a determination as to whether the presence of the preceding vehicle is confirmed in past frames at the equivalent three-dimensional positions, and may count the number of times that the preceding vehicle is confirmed. The number of times that the preceding vehicle is confirmed may influence reliability of likelihood that the preceding vehicle candidate is the preceding vehicle. The preceding vehicle recognizer 172 may also make a determination as to whether the preceding vehicle candidate satisfies a condition that the preceding vehicle candidate has reliability as the preceding vehicle, and a determination as to whether the preceding vehicle candidate satisfies a condition that the preceding vehicle candidate lacks the reliability as the preceding vehicle. Moreover, on the basis of a result of the determination, the preceding vehicle recognizer 172 may identify the preceding vehicle candidate as the preceding vehicle, or may remove the preceding vehicle candidate from the preceding vehicle candidates. Note that any of various existing techniques, such as the technique disclosed in JP-A No. 2014-232431, may be employed for the preceding vehicle recognizing process S210 and a description of the preceding vehicle recognizing process S210 will not be given in detail here.

Thereafter, the preceding vehicle recognizer 172 may perform the correction of the thus-identified preceding vehicle, on the basis of the tail lamp point and the non tail lamp point both accumulated by the preceding vehicle extractor 170. Specifically, the preceding vehicle recognizer 172 may remove the identified preceding vehicle from the preceding vehicle candidate when the non tail lamp point is equal to or greater than a predetermined value that may be, for example, 3 (three). The preceding vehicle recognizer 172 may later identify the removed preceding vehicle as the preceding vehicle again when the tail lamp point for the removed preceding vehicle is equal to or greater than a predetermined value. In this way, the tail lamp point indicating "the likelihood that the tail lamp candidate is the tail lamp" is set to reflect more strongly than the non tail lamp point indicating "the likelihood that the tail lamp candidate is not the tail lamp". The correction that removes the identified preceding vehicle from the preceding vehicle candidate may be directed only to the preceding vehicle candidate present in the region determined as being irradiated with the high beams. One reason is to stabilize the recognition of the preceding vehicle.

The predetermined value to be compared with the tail lamp point may vary depending on the number of tail lamps. For example, the predetermined value may be 8 when the number of tail lamps is one, and may be 5 or any other number when the number of tail lamps is two or more. One reason is to make it difficult to erroneously detect the reflector present alone on a road shoulder as the tail lamp.

[Oncoming Vehicle Extracting Process S212]

Thereafter, the oncoming vehicle extractor 174 may extract the headlamps from the oncoming vehicle detection range 220b on the basis of a luminance, color information, and a three-dimensional position. Note that the second luminance image 212 that is based on the short exposure time may be used due to the headlamps of the oncoming vehicle which are different in light amount from the tail lamps of the preceding vehicle as described above.

Thereafter, the oncoming vehicle extractor 174 may perform grouping of the pixels in the oncoming vehicle detection range 220b. Specifically, the oncoming vehicle extractor 174 may perform the grouping of the pixels in the oncoming vehicle detection range 220b by collecting the pixels in each of which the luminance is equal to or greater than a predetermined luminance threshold (such as 5 to 10 on a scale from 1 to 256) and in which their respective three-dimensional positions are within a predetermined distance range (such as falls within 1.5 pixels) with respect to each other. Here, the oncoming vehicle extractor 174 may perform grouping of the pixels located within a rectangular region. The rectangular region may be defined by horizontal lines and vertical lines, and include all of the pixels that satisfy the foregoing conditions. The thus-grouped pixels may be handled as a headlamp candidate that serves as a candidate identifiable as the headlamp. The headlamp candidate following the grouping may contain basic characteristic amounts such as: coordinates of left, right, top, and bottom parts of the group, i.e., coordinates of four corners of the group; the number of pixels in the group; a maximum luminance value in the group; a minimum luminance value in the group, and an average depth distance, i.e., an average parallax, of the group.

In the present implementation, the oncoming vehicle extractor 174 may exclude the grouped pixels from the headlamp candidate when the grouped pixels satisfy any of the following exclusion conditions. For example, the exclusion conditions may include: a difference (a size) between the coordinates of the left, right, top, and bottom parts of the group which is equal to or less than a predetermined value (for example, 2 pixels); a difference (a size) between the coordinates of the left, right, top, and bottom parts of the group which is equal to or greater than a predetermined value (which may be determined by the depth distance); and the number of pixels in the group which is equal to or less than a predetermined value (for example, 2). Note that the predetermined value to be compared with the luminance may be adjusted by taking into consideration the predetermined value in a previous frame. Note that any of various existing techniques, such as the technique disclosed in JP-A No. 2014-232430, may be employed for the oncoming vehicle extracting process S212 and a description of the oncoming vehicle extracting process S212 will not be given in detail here.

The technique according to the preceding vehicle extracting process S208 described above may be utilized as it is for the oncoming vehicle extracting process S212. Specifically, the oncoming vehicle extractor 174 may recognize that the application range is a region to which the low beams are to be applied (i.e., the high beams are not to be applied), when either one of the result information regarding which application range the illumination mechanism 124 has applied the high beams and the information regarding which application range the light-distribution controller 184 has instructed the recipient to apply the high beams indicates the application of the low beams application (i.e., when none of them indicates the application of the high beams). For example, the oncoming vehicle extractor 174 may determine that the low beams are applied when either of those pieces of information indicates the application of the low beams in a case of the HBA. In a case of the ADB, the oncoming vehicle extractor 174 may determine that the low beams are applied when either of those pieces of information indicates the application of the low beams for any of the angular ranges (i.e., any of the angular regions).

With this configuration, it is possible to continue the detection of the oncoming vehicle in a stable manner by using a low value, i.e., a flexible value, for the threshold. This is possible, for one reason to be discussed below, even in the situation where the result information regarding which application range the illumination mechanism 124 has applied the high beams still indicates the application of the high beams due to the delay in CAN communication or any other factor following the change of the states of the headlights from the high beams to the low beams. One reason is that the information regarding which application range the light-distribution controller 184 has instructed the recipient to apply the high beams indicates the application of the low beams, i.e., does not indicate the application of the high beams. Hence, it is possible to reduce a possibility that the oncoming vehicle is irradiated with the high beams.

Further, the oncoming vehicle extractor 174 may be able to determine, by means of calculation, which range in the luminance images 212 the high beams are applied, on the basis of the angle of view of the block and the depth distance of the block and the cut-off line angle. With this configuration, it is possible to prevent the occurrence of hunting between the high beams and the low beams and thereby reduce the possibility that the oncoming vehicle is irradiated with the high beams.

[Oncoming Vehicle Recognizing Process S214]

Thereafter, the oncoming vehicle recognizer 176 may perform grouping of the headlamps extracted by the oncoming vehicle extractor 174, and recognize the oncoming vehicle in the oncoming vehicle detection range 220b.

Specifically, the oncoming vehicle recognizer 176 may perform the grouping of the headlamps and recognize the grouped headlamps as a candidate identifiable as the oncoming vehicle, i.e., an oncoming vehicle candidate, when all of the following conditions are satisfied. For example, the conditions may include: whether a distance in the images between the headlamps (the groups) falls within a distance range in which those headlamps are determinable as belonging to the same vehicle, e.g., whether the distance is longer than the predetermined distance range in the oncoming vehicle extracting process S212; whether a difference in the average depth distance of the headlamps falls within a distance range in which those headlamps are determinable as belonging to the same vehicle; and whether a proportion of the maximum luminance value falls within a predetermined range.

The thus-grouped oncoming vehicle candidate may take over the basic characteristic amounts of the headlamps before the grouping. For example, coordinates of left, right, top, and bottom parts of the oncoming vehicle candidate, i.e., coordinates of four corners of the oncoming vehicle candidate, may take over coordinates that are equivalent to those located outward of the oncoming vehicle candidate among coordinates of left, right, top, and bottom parts of each of the headlamps, i.e., coordinates of four corners of each of the headlamps. Further, a maximum luminance value and a minimum luminance value of the oncoming vehicle candidate may respectively take over larger one of the maximum luminance values and larger one of the minimum luminance values of the headlamps. Moreover, an average depth distance (an average parallax) of the oncoming vehicle candidate may take over shorter one of the average depth distances of the headlamps, i.e., may take over larger one of the average parallaxes of the headlamps. The oncoming vehicle recognizer 176 may also count the number of headlamps included in the oncoming vehicle candidate.

Further, the oncoming vehicle recognizer 176 may make a determination as to whether the presence of the oncoming vehicle is confirmed in past frames at the equivalent three-dimensional positions, and may count the number of times that the oncoming vehicle is confirmed. The number of times that the oncoming vehicle is confirmed may influence reliability of likelihood that the oncoming vehicle candidate is the oncoming vehicle. The oncoming vehicle recognizer 176 may also make a determination as to whether the oncoming vehicle candidate satisfies a condition that the oncoming vehicle candidate has reliability as the oncoming vehicle, and a determination as to whether the oncoming vehicle candidate satisfies a condition that the oncoming vehicle candidate lacks the reliability as the oncoming vehicle. Moreover, on the basis of a result of the determination, the oncoming vehicle recognizer 176 may identify the oncoming vehicle candidate as the oncoming vehicle, or may remove the oncoming vehicle candidate from the oncoming vehicle candidates. Note that any of various existing techniques, such as the technique disclosed in JP-A No. 2014-231301, may be employed for the oncoming vehicle recognizing process S214 and a description of the oncoming vehicle recognizing process S214 will not be given in detail here.

[Street Light Extracting Process S216]

Thereafter, the street light extractor 178 may extract the street lights from the street light detection range 220c on the basis of a luminance, color information, and a three-dimensional position, by means of a process similar to the process performed in the oncoming vehicle extracting process S212.

[Street Light Recognizing Process S218]

The street light recognizer 180 may recognize the street lights extracted by the street light extractor 178. Note that the street lights are not the three-dimensional objects in which the application of the high beams is undesirable; however, the recognized street lights may be utilized in a later traveling scene determining process S220.

[Traveling Scene Determining Process S220]

The traveling scene determiner 182 may make the determination as to whether a traveling scene is a traveling scene in which the application of the high beams is possible. For example, the traveling scene determiner 182 may determine that the traveling scene is the scene in which the high beams are unnecessary when a speed of the own vehicle 1 is equal to or less than a predetermined value, such as equal to or less than 20 km/h. The traveling scene determiner 182 may also determine that the traveling scene is the scene in which the high beams are unnecessary when the own vehicle 1 makes a left turn or a right turn. The traveling scene determiner 182 may determine that an environment outside the own vehicle 1 is sufficiently light and thus determine that the traveling scene is the scene in which the high beams are unnecessary when the number of street lights present is equal to or greater than a predetermined number, such as 3. Note that any of various existing techniques, such as the techniques disclosed in JP-A Nos. 2014-232408 and 2014-232409, may be employed for the traveling scene determining process S220 and a description of the traveling scene determining process S220 will not be given in detail here.

[Light-Distribution Controlling Process S222]

The light-distribution controller 184 may finally execute the light-distribution control of the headlamps of the own vehicle 1, on the basis of the preceding vehicle, the oncoming vehicle, and the traveling scene.

FIG. 14 describes an operation to be performed by the light-distribution controller 184. Referring to FIG. 14, when the traveling scene determiner 182 determines that the traveling scene is the scene in which the high beams are unnecessary, the light-distribution controller 184 may refrain from performing the application of the high beams regardless of whether the light-distribution control is based on the HBA or the ADB and regardless of the number of three-dimensional objects in which the application of the high beams is undesirable (such as the preceding vehicle and the oncoming vehicle). For the HBA, when the traveling scene determiner 182 determines that the traveling scene is the scene in which the use of the high beams is allowed, the light-distribution controller 184 may refrain from performing the application of the high beams when there is one or more three-dimensional objects in which the application of the high beams is undesirable, and may perform the application of the high beams when there is no three-dimensional object in which the application of the high beams is undesirable. For the ADB, when there is one or more three-dimensional objects in which the application of the high beams is undesirable, the light-distribution controller 184 may perform the application of the high beams on some regions while preventing the one or more three-dimensional objects from being irradiated with the high beams. The light-distribution controller 184 may perform the application of the high beams on all of the regions when there is no three-dimensional object in which the application of the high beams is undesirable for the ADB.

Figure 15A:
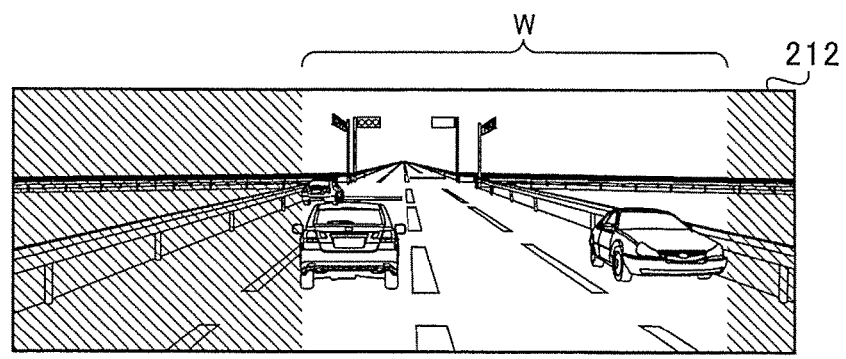
FIG. 15A and FIG. 15B describe the light-distribution control based on an adaptive driving beam (ADB).
Figure 15B:
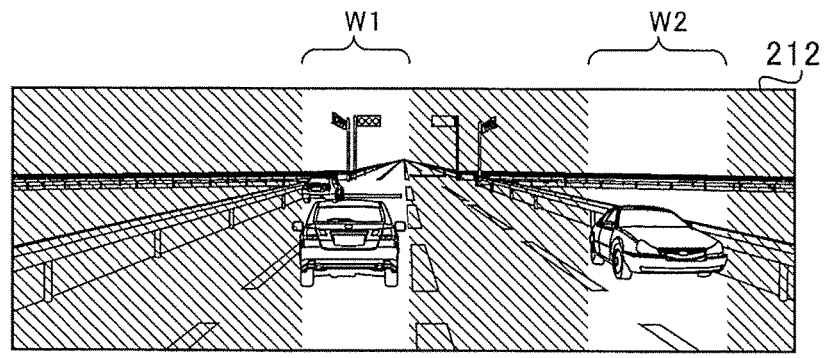

FIG. 15A and FIG. 15B describe the light-distribution control based on the ADB. When there is one or more three-dimensional objects in which the application of the high beams is undesirable in an example where the ADB is employed, a maximum width W in a horizontal direction of the three-dimensional objects as a whole may be calculated to perform the application of the high beams on outer side of locations of the three-dimensional objects as illustrated in FIG. 15A. In an example where it is possible to apply the high beams also to a middle region by applying the high beams based on the ADB in a divided fashion, a maximum width W1 in the horizontal direction of the preceding vehicle and a maximum width W2 in the horizontal direction of the oncoming vehicle, in each of which the application of the high beams is undesirable, may be calculated to perform the application of the high beams on the middle region and outer side of locations of the preceding vehicle and the oncoming vehicle as illustrated in FIG. 15B.

Note that, in an example where the ADB is employed, the oncoming vehicle sometimes falls outside the oncoming vehicle detection range 220b when the oncoming vehicle comes extremely close to the own vehicle 1. To address this, the application of the high beams in a direction in which the own vehicle 1 and the oncoming vehicle are expected to go by each other may be halted for a given period of time (such as one second) when the oncoming vehicle comes close to the own vehicle 1 by a certain depth distance (such as 50 meters).

The vehicle exterior environment recognition apparatus 120 according to one implementation is therefore able to perform the light-distribution control of the headlamps appropriately.

In one implementation described above, the central controller 154 may include a semiconductor integrated circuit that may have devices such as, but not limited to, the central processing unit (CPU), the ROM, and the RAM. The implementation, however, is not limited thereto. In an alternative implementation, the central controller 154 may include an integrated circuit such as, but not limited to, a field programmable gate array (FPGA) and an application specific integrated circuit (ASIC). The central controller 154 or any other controller may include one or more central processing units, one or more FPGAs, and/or one or more ASICs.

The implementation also provides a program that causes a computer to function as the vehicle exterior environment recognition apparatus 120, and a recording medium that stores the program. The recording medium is computer readable. Non-limiting examples of the recording medium may include a flexible disk, a magneto-optical disk, ROM, CD, DVD (Registered Trademark), and BD (Registered Trademark). As used herein, the term "program" may refer to a data processor written in any language and any description method.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, in one implementation described above, the description is given by referring to the light-distribution control based on the HBA or the ADB where appropriate. The implementation, however, is not limited thereto. Any and all of the processes described above are applicable to any light-distribution control.

Further, the various thresholds set in one implementation described above may be modified on an as-needed basis. The thresholds may be set on the basis of values obtained by experience, experiments, or any other factor.

A part or all of the processes in the vehicle exterior environment recognition process as disclosed herein does not necessarily have to be processed on a time-series basis in the order described in the example flowchart. A part or all of the processes in the vehicle exterior environment recognition process may involve parallel processing or processing based on subroutine.

According to one implementation, it is therefore possible to increase identification accuracy of the tail lamps of the preceding vehicle.

The invention claimed is:

1. A vehicle exterior environment recognition apparatus comprising:
   a controller; and
   a memory storing instructions that, when executed by the controller, cause the controller to function as:
      a preceding vehicle extractor that extracts a tail lamp of a preceding vehicle from an image based on determining that luminance of the tail lamp meets a first threshold;
      a preceding vehicle recognizer that determines whether the image includes the preceding vehicle based on the extracted tail lamp;
      a light-distribution controller that:
         determines a light distribution instruction, the light distribution instruction including one of 1) a first instruction for setting a state of a headlamp of an own vehicle to a low beam based on determining that the image includes the preceding vehicle, and 2) a second instruction for setting the state of the headlamp to a high beam based on determining that the image does not include the preceding vehicle;
         transmits the determined light distribution instruction to the preceding vehicle extractor and to an illumination mechanism; and
      the illumination mechanism that:
         receives the determined light distribution instruction from the light distribution controller;
         sets the state of the headlamp based on the light distribution instruction, wherein the preceding vehicle extractor:
         receives, from the light-distribution controller, the determined light distribution instruction;
         receives from the illumination mechanism at a time of receiving the determined light distribution instruction, a currently set state of the headlamp;
         determines that at least one of 1) the determined light distribution instruction indicating setting the headlamp to the low beam and 2) the currently set state of the headlamp indicates the low beam; and
         adjusts the first threshold for extracting the tail lamp to a second threshold that corresponds to setting the headlamp to the low beam based on determining that at least one of 1) the light distribution instruction and 2) the currently set state of the headlamp indicates setting the headlamp to the low beam.

2. The vehicle exterior environment recognition apparatus according to claim 1, wherein the light-distribution controller determines, within the image, a region to apply the high beam to, and
   wherein the light distribution instruction and the set state of the headlamp each contain information on the region to which the high beam is to be applied.

3. The vehicle exterior environment recognition apparatus according to claim 2, wherein the preceding vehicle extractor extracts the tail lamp from an region of the image based on an angle of view of the image and a depth distance of the tail lamp in the image, and wherein the preceding vehicle extractor determines whether either one of the light distribution instruction and the set state of the headlamp indicates the application of the low beam for the region based on the angle of view in the image and the depth distance in the image.

4. The vehicle exterior environment recognition apparatus according to claim 1, wherein the preceding vehicle extractor extracts the tail lamp from an region of the image based on an angle of view of the image and a depth distance of the tail lamp in the image, and wherein the preceding vehicle extractor determines whether either one of the light distribution instruction and the set state of the headlamp indicates the application of the low beam for the region based on the angle of view in the image and the depth distance in the image.

* * * * *